United States Patent
Ianev et al.

(10) Patent No.: US 11,109,259 B2
(45) Date of Patent: Aug. 31, 2021

(54) LOAD CONTROL FROM CONTROL PLANE CIOT EPS OPTIMISATION

(71) Applicant: NEC Corporation, Tokyo (JP)

(72) Inventors: Iskren Ianev, Reading (GB); Genadi Velev, Heidelberg (DE); Andreas Kunz, Heidelberg (DE); Toshiyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 365 days.

(21) Appl. No.: 16/088,881

(22) PCT Filed: Mar. 23, 2017

(86) PCT No.: PCT/JP2017/011717
§ 371 (c)(1),
(2) Date: Sep. 27, 2018

(87) PCT Pub. No.: WO2017/170122
PCT Pub. Date: Oct. 5, 2017

(65) Prior Publication Data
US 2020/0305022 A1    Sep. 24, 2020

(30) Foreign Application Priority Data
Apr. 1, 2016  (EP) .................................. 16275049

(51) Int. Cl.
*H04W 28/02*  (2009.01)
*H04W 48/06*  (2009.01)
(Continued)

(52) U.S. Cl.
CPC ......... *H04W 28/0247* (2013.01); *H04W 4/70* (2018.02); *H04W 24/08* (2013.01);
(Continued)

(58) Field of Classification Search
CPC ...... H04L 1/0002; H04W 4/70; H04W 24/08; H04W 28/02; H04W 28/0205;
(Continued)

(56) References Cited

U.S. PATENT DOCUMENTS 10,567,995 B2 * 2/2020 Kawasaki ............. H04W 28/06
10,575,318 B2 * 2/2020 Park .................. H04W 74/0875
(Continued)

FOREIGN PATENT DOCUMENTS

| JP | 2012-253562 A | 12/2012 |
| WO | 2017/140387 A1 | 8/2017 |
| WO | 2017/166221 A1 | 10/2017 |

OTHER PUBLICATIONS

European Office Action for EP Application No. 17717889.4 dated Nov. 12, 2020.
(Continued)

*Primary Examiner* — Frank Duong
(74) *Attorney, Agent, or Firm* — Sughrue Mion, PLLC

(57) ABSTRACT

A core network node includes a transmitter configured to transmit a control plane data back-off timer to restrict a request from a UE for data transmission via Control Plane CIoT EPS Optimization. A UE includes a receiver configured to receive a control plane data back-off timer from a core network node, and a controller configured to not initiate data transmission via Control Plane CIoT EPS Optimization while the control plane data back-off timer is running.

14 Claims, 14 Drawing Sheets

(51) Int. Cl.
*H04W 24/08* (2009.01)
*H04W 28/06* (2009.01)
*H04W 4/70* (2018.01)
*H04W 76/18* (2018.01)
*H04W 88/14* (2009.01)

(52) U.S. Cl.
CPC ... *H04W 28/0205* (2013.01); *H04W 28/0215* (2013.01); *H04W 28/0289* (2013.01); *H04W 28/065* (2013.01); *H04W 48/06* (2013.01); *H04W 76/18* (2018.02); *H04W 88/14* (2013.01)

(58) Field of Classification Search
CPC ......... H04W 28/0215; H04W 28/0247; H04W 28/0289; H04W 28/065; H04W 28/12; H04W 48/06; H04W 72/04; H04W 76/18; H04W 88/16; H04W 88/14
See application file for complete search history.

(56) References Cited

U.S. PATENT DOCUMENTS

| | | | | |
|---|---|---|---|---|
| 10,616,936 | B2* | 4/2020 | Velev | H04W 24/08 |
| 10,694,447 | B2* | 6/2020 | Kim | H04W 76/10 |
| 10,721,612 | B2* | 7/2020 | Ryu | H04W 76/27 |
| 10,750,400 | B2* | 8/2020 | Griot | H04W 28/0273 |
| 10,805,036 | B2* | 10/2020 | Ronneke | H04W 88/16 |
| 10,849,028 | B2* | 11/2020 | Kim | H04W 4/70 |
| 2012/0082029 | A1* | 4/2012 | Liao | H04W 76/15 |
| | | | | 370/230 |
| 2014/0301200 | A1 | 10/2014 | Miura et al. | |
| 2015/0003228 | A1* | 1/2015 | Choi | H04W 76/19 |
| | | | | 370/216 |
| 2015/0249900 | A1 | 9/2015 | Kim et al. | |
| 2018/0212710 | A1 | 7/2018 | Rönneke et al. | |
| 2019/0028878 | A1* | 1/2019 | Kawasaki | H04W 92/04 |
| 2019/0037475 | A1 | 1/2019 | Zhang et al. | |
| 2019/0141563 | A1* | 5/2019 | Ianev | H04W 28/065 |
| 2020/0037203 | A1* | 1/2020 | Ianev | H04W 28/06 |
| 2020/0196186 | A1* | 6/2020 | Gupta | H04W 28/0289 |
| 2021/0084528 | A1* | 3/2021 | Kim | H04W 76/30 |

OTHER PUBLICATIONS

Intel Corporation: "General LTE RRC impacts to enable CIoT solutions", 3GPP Draft; R2-161263_INTEL_TEI-13_RRC_GENERAL_IMPACTS, 3rd Generation Partnership Project (3GPP), Mobile Competence Centre ; 650, Route Des Lucioles ; F-06921 Sophia-Antipolis Cedex ; France, vol. RAN WG2, No. St. Julian's, Malta; Feb. 15, 2016-Feb. 19, 2016 Feb. 14, 2016 (Feb. 14, 2016), Meeting #93, XP051055205, Retrieved from the Internet: URL:http://www.3gpp.org/ftp/Meetings_3GPP_SYNC/RAN2/Docs/.

"3rd Generation Partnership Project; Technical Specification Group Services and System Aspects; General Packet Radio Service (GPRS) enhancements for Evolved Universal Terrestrial Radio Access Network (E-UTRAN) access (Release 13)," vol. SA WG2. No. V13.6.1, Mar. 2016, pp. 1-365.

U.S. Office Action for U.S. Appl. No. 16/088,899 dated Dec. 27, 2019.

3rd Generation Partnership Project; Technical Specification Group Radio Access Network; Evolved Universal Terrestrial Radio Access Network (E-UTRAN); S1 Application Protocol (S1AP) (Release 13), 3GPP TS 36.413 V13.1.0 (Dec. 2015), pp. 1-314 (Year: 2015), France.

Japanese Office Action for JP Application No. 2018-550612 dated Dec. 2, 2020 with English Translation.

* cited by examiner

LOAD CONTROL FROM CONTROL PLANE CIOT EPS OPTIMISATION

This application is a National Stage Entry of PCT/JP2017/011717 filed on Mar. 23, 2017, which claims priority from EP Patent Application 16275049.1 filed on Apr. 1, 2016, the contents of all of which are incorporated herein by reference, in their entirety.

TECHNICAL FIELD

The present disclosure relates to a communication system. The disclosure has particular but not exclusive relevance to wireless communication systems and devices thereof operating according to the 3rd Generation Partnership Project (3GPP) standards or equivalents or derivatives thereof, such as the Universal Terrestrial Radio Access Network (UTRAN) and the Long Term Evolution (LTE) of UTRAN (E-UTRAN), including LTE-Advanced. The disclosure has particular although not exclusive relevance to control plane optimisation.

BACKGROUND ART

Abbreviations and Terminology

The following abbreviations and terminology (whenever differently stated) are used in the current specification:

TABLE 1

| | |
|---|---|
| 3GPP | $3^{rd}$ Generation Partnership Project |
| APN | Access Point Name |
| AS | Access Stratum |
| CIoT | Cellular Internet of Things |
| EPS | Evolved Packet System |
| ESM | EPS Session management |
| E-UTRAN | Evolved Universal Terrestrial Radio Access Network (also used as EUTRAN) |
| GPRS | General Packet Radio Service |
| GTP | GPRS Tunneling Protocol |
| GUTI | Globally Unique Temporary ID |
| HPLMN | Home Public Land Mobile Network |
| HSS | Home Subscriber Server |
| MME | Mobility Management Entity |
| MNO | Mobile Network Operator |
| NAS | Non Access Stratum |
| NB, eNB | Node B, evolved Node B (but can also be any 'RAN node' implementing 2G, 3G, 4G or future 5G technology) |
| NIDD | Non-IP Data Delivery |
| PGW | Packet Data Network Gateway |
| PDN | Packet Data Networks |
| PDU | Protocol Data Unit |
| RAU | Routing Area Update |
| RNC | Radio Network Controller |
| RRC | Radio Resource Control |
| PLMN | Public Land Mobile Network |
| S1-U | Reference point between E-UTRAN and Serving GW. |
| S1AP | S1 Application Protocol |
| SCEF | Service Capability Exposure Function |
| SGSN | Serving GPRS Support Node |
| S-GW | Serving Gateway |
| SMS | Short Message Service |
| TAU | Tracking Area Update |
| UE | User Equipment |
| UTRAN | UMTS Terrestrial Radio Access Network |

The following terminologies are used within this specification:

Cellular IoT: Cellular network supporting low complexity and low throughput devices for a network of Things. Cellular IoT supports both IP and Non-IP traffic.

Narrowband-IoT (NB-IoT): a 3GPP Radio Access Technology that forms part of Cellular IoT. It allows access to network services via E-UTRA with a channel bandwidth limited to 180 kHz (corresponding to one Physical Resource Block (PRB)). Unless otherwise indicated in a clause or sub-clause, Narrowband-IoT is a subset of E-UTRAN.

WB-E-UTRAN: Wide Band (WB)-E-UTRAN is the part of E-UTRAN that excludes NB-IoT.

Control Plane CIoT EPS Optimisation: support of infrequent small data transmission (for IP data, non-IP data and SMS) via optimised Control Plane signalling. Mandatory for UE and the network.

User Plane CIoT EPS Optimisation: support of infrequent small data transmission (for IP data and SMS) via optimised User Plane. Optional for both the UE and the network.

Under the 3GPP standards, a 'NodeB' (or an 'eNB' in LTE) is the base station via which mobile devices connect to a core network and communicate to other mobile devices or remote servers. In order to be able to do so, the mobile devices establish a so called radio resource control (RRC) connection with a serving base station. For simplicity, the present application will use the term base station to refer to any such base stations. Communication devices might be, for example, mobile communication devices such as mobile telephones, smartphones, user equipment, personal digital assistants, machine type communication (MTC) devices, laptop computers, web browsers, and the like. 3GPP standards also make it possible to connect non-mobile user equipment to the network, such as Wi-Fi routers, modems, which can be implemented as a part of a (generally) stationary apparatus.

Under the 3GPP standards, base stations are coupled to a core network (referred to as an enhanced packet core (EPC) network in LTE). In order to keep track of the mobile devices and to facilitate movement between the different base stations, the core network comprises a number of mobility management entities (MMEs) which are in communication with the base stations coupled to the core network. Communication between the mobile devices and their associated MME is carried out using non-access stratum (NAS) signalling (via the serving base station).

3GPP has been studying the architecture enhancements to support ultra-low complexity, power constrained, and low data-rate MTC devices referred to as 'Cellular Internet of Things' (CIoT) devices. The main focus of the work in 3GPP is to support highly efficient handling of infrequent small data transmissions (e.g. based on the traffic model in TR 45.820 Ver. 13.1.0) with minimised overhead for system signalling without compromising e.g. security.

Effectively, the Internet of Things is a network of devices (or "things") equipped with appropriate electronics, software, sensors, network connectivity, and/or the like, which enables these devices to collect and exchange data with each other and with other communication devices. For simplicity, the present application refers to user equipment (UE) or mobile devices in the description and the figures (in the context of CIoT devices) but it will be appreciated that the technology described can be implemented on any mobile and "non-mobile" equipment that can connect to such a core network.

The following architectural enhancements for improved support for small data transfer have already been achieved within 3GPP Rel-13 NB-IoT work:

User Plane CIoT EPS Optimisation—based on optimised User Plane transport of data;

Control Plane CIoT EPS Optimisation—transports user data via MME by encapsulating user data in NAS PDUs, reducing the total number of control plane messages when handling a short data transaction.

When attaching or re-attaching (Attach, RAU/TAU) to a network, a NB-CIoT UE or a WB-CIoT UE includes in a Preferred Network Behaviour indication the Network Behaviour the UE can support and what it would prefer to use. The Preferred Network Behaviour includes this information:

whether Control Plane CIoT EPS Optimisation is supported;

whether User Plane CIoT EPS Optimisation is supported;

whether Control Plane or User Plane CIoT EPS Optimisation is preferred;

whether S1-U data transfer is supported;

whether SMS transfer without Combined Attach is requested;

whether Attach without PDN Connectivity is supported;

whether header compression for Control Plane CIoT EPS Optimisation is supported.

The MME indicates the network behaviour it accepts in the Supported Network Behaviour information. The MME may indicate one or more of the following:

whether Control Plane CIoT EPS Optimisation is supported;

whether User Plane CIoT EPS Optimisation is supported;

whether S1-U data transfer is supported;

whether SMS transfer without Combined Attach is accepted;

whether Attach without PDN Connectivity is supported;

whether header compression for Control Plane CIoT EPS Optimisation is supported.

A UE that supports NB-IoT shall always indicate support for Control Plane CIoT EPS Optimisation (i.e Control Plane CIoT EPS Optimisation support is mandatory).

If a UE includes a Preferred Network Behaviour, this defines the Network Behaviour the UE is expecting to be available in the network.

When selecting an MME for a UE that is using the NB-IoT RAT, and/or for a UE that signals support for CIoT EPS Optimisations in RRC signalling, the eNodeB's MME selection algorithm shall select an MME taking into account the MME's support (or non-support) for the Release 13 NAS signalling protocol.

<Data Transfer in Control Plane CIoT EPS Optimization>

If the UE 3 and the MME 9 use the Control Plane CIoT EPS Optimisation, they can transfer data in NAS PDUs including the EPS Bearer Identity of the PDN connection they relate to (see, FIGS. 1 and 2). Both the IP and Non IP data types are supported. This is accomplished by using the NAS transport capabilities of RRC and S1-AP protocols and the data transport of GTP-u tunnels between MME 9 and S-GW 18S and between S-GW 18S and P-GW 18P, or if a Non-IP connection is provided by via the MME 9 with the SCEF, then data transfer occurs as indicated in TS23.682 Ver. 13.5.0. To minimize potential conflicts between NAS signaling PDUs and NAS Data PDUs, the MME 9 should complete any security related procedures (e.g. Authentication, Security Mode Command, GUTI reallocation) before alerting the HSS, MSC or SGW of the UE's entry into ECM-CONNECTED state, and before commencing downlink transfer of NAS Data PDUs.

<Data Transfer in User Plane CIoT EPS Optimization>

The User Plane CIoT EPS Optimization functionality enables support for transfer of user plane data without the need for using the Service Request procedure to establish Access Stratum (AS) context in the serving eNodeB and UE. As a precondition the UE needs to perform an initial connection establishment that establishes the AS bearers and the AS security context in the network and UE and the RRC connection is suspended by means of a Connection Suspend Procedure, see FIG. 3 (TS23.401 Ver. 13.6.1 subclause 5.3.4A).

By using the Connection Suspend procedure:

the UE 3 at transition into ECM-IDLE stores the AS information;

the eNodeB 5 stores the AS information, the S1AP association and the bearer context for that UE 3;

MME 9 stores the S1AP association and the bearer context for that UE 3 and enters ECM-IDLE;

In the context of this functionality, the UE 3 and the eNodeB 5 store the relevant AS information at transition into ECM-IDLE.

At any subsequent transaction trigger from the NAS layer when UE is in ECM-IDLE, the UE shall attempt the Connection Resume procedure, see FIG. 4 (TS 24.301 Ver. 13.5.0 sub-clause 5.3.5A).

If the Connection Resume procedure fails, the UE 3 initiates the pending NAS procedure. To maintain support for User Plane EPS Optimization at UE mobility between cells configured on different eNodeBs, the AS Context should be transferred between the eNodeBs.

By using the Connection Resume procedure:

the UE 3 resumes the connection with the network using the AS information stored during the Connection Suspend procedure;

the, potentially new, eNodeB 5 notifies the MME 9 that the connection with the UE 3 has been securely resumed and the MME 9 enters ECM-CONNECTED.

SUMMARY OF INVENTION

Technical Problem

The newly agreed data transmission via Control Plane CIoT EPS Optimisation is expected to add an extra load to the network control plane entities like MME and SGSN which are used to handle signalling messages that are relatively smaller compared to the data that MME and SGSN should handle with the deployment of the Control Plane CIoT EPS Optimisation.

3GPP has already addressed this or related issue with some initial restrictions like:

Reject RRC connection requests from UEs that access the network to send user data via the Control Plane CIoT EPS Optimisation for non-exception reporting (TS23.401, s4.3.7.4.1);

Under unusual circumstances (e.g. when the MME load exceeds an operator configured threshold), the MME may restrict NIDD Submit Request messages that its SCEFs are generating on it, if configured to do so. (TS23.401, s4.3.7.4.1b).

The MME may, based on subscription information or MME policies, perform rate control of user data sent using Control Plane CIoT EPS Optimisation. In the case of rate control, the UE applies the rate control as long as the UE is attached to the network or until the rate control information is updated by a subsequent NAS message containing rate control information. (TS23.401, s4.7.7).

There are also already existing ways for NAS level congestion control, which apply for limiting the signaling from the UE:

APN based congestion control (TS23.401, s4.3.7.4.2.3) where the MME may reject the EPS Session Management (ESM) requests from the UE (e.g. PDN Connectivity, Bearer Resource Allocation or Bearer Resource Modification Requests) with a Session Management back-off timer when ESM congestion associated with the APN is detected.

General NAS level Mobility Management control (TS23.401, s4.3.7.4.2.4) where under general overload conditions the MME may reject Mobility Management signalling requests from UEs. Throughout this specification, a term of "timer" means "a signal indicative of a timer value" or "a timer function" realized by software.

Problem Statement

The above restrictions however (new and old) are mostly addressing 1) the overload from non-IP downlink data (SCEF) and 2) overcoming the APN and MM associated congestion in the control plane by limiting the RRC/NAS signalling from the UE. There is no way of restricting the overload in the control plane functional entities caused from the data transmission over the Control Plane as per CIoT EPS optimizations. The conclusion is that Control Plane CIoT EPS optimisation (i.e. data transfer via MME and SGSN) can contribute greatly for the MME and SGSN overload if an appropriate load control with emphasis on the communication via Control Plane CIoT EPS Optimisation is not made available. The solutions in this disclosure are about how to control and avoid the system (e.g. MME/SGSN) overload from excessive use of Control Plane CIoT EPS Optimisation for data transfer.

Solution to Problem

In one aspect, the disclosure provides a core network node, comprising: a transmitter configured to transmit a control plane data back-off timer to restrict a request from a UE (User Equipment) for data transmission via Control Plane CIoT (Cellular Internet of Things) EPS (Evolved Packet System) Optimization.

In one aspect, the disclosure provides a UE (User Equipment), comprising: a receiver configured to receive a control plane data back-off timer from a core network node; and a controller configured to not initiate data transmission via Control Plane CIoT (Cellular Internet of Things) EPS (Evolved Packet System) Optimization while the control plane data back-off timer is running.

In one aspect, the disclosure provides a transmission controlling method, comprising: transmitting a control plane data back-off timer to restrict a request from a User Equipment (UE) for data transmission via Control Plane CIoT (Cellular Internet of Things) EPS (Evolved Packet System) Optimization.

In one aspect, the disclosure provides a communication method, comprising: receiving a control plane data back-off timer from a core network node; and not initiating data transmission via Control Plane CIoT (Cellular Internet of Things) EPS (Evolved Packet System) Optimization while the control plane data back-off timer is running.

DESCRIPTION OF EMBODIMENTS

Description of the Solutions with Embodiments

One main idea of the proposed solution is to limit the transmission of data PDU(s) from the UE to the network (MME/SGSN) over the control plane applying the CIoT EPS Optimizations whereas the UE is still able to transmit control plane signalling (e.g. for TAU/RAU procedures or Service Request). The transmission limitation of data PDU (s) can be applied either as 1) no data PDU transmission for a certain time period or 2) as limited transmission rate for a certain time period (e.g. using a designated back-off timer). This main idea is described below in the alternatives in solution 1 or solution 2.

Solution 1—C-Plane Data Back-Off Timer

Figure 1:
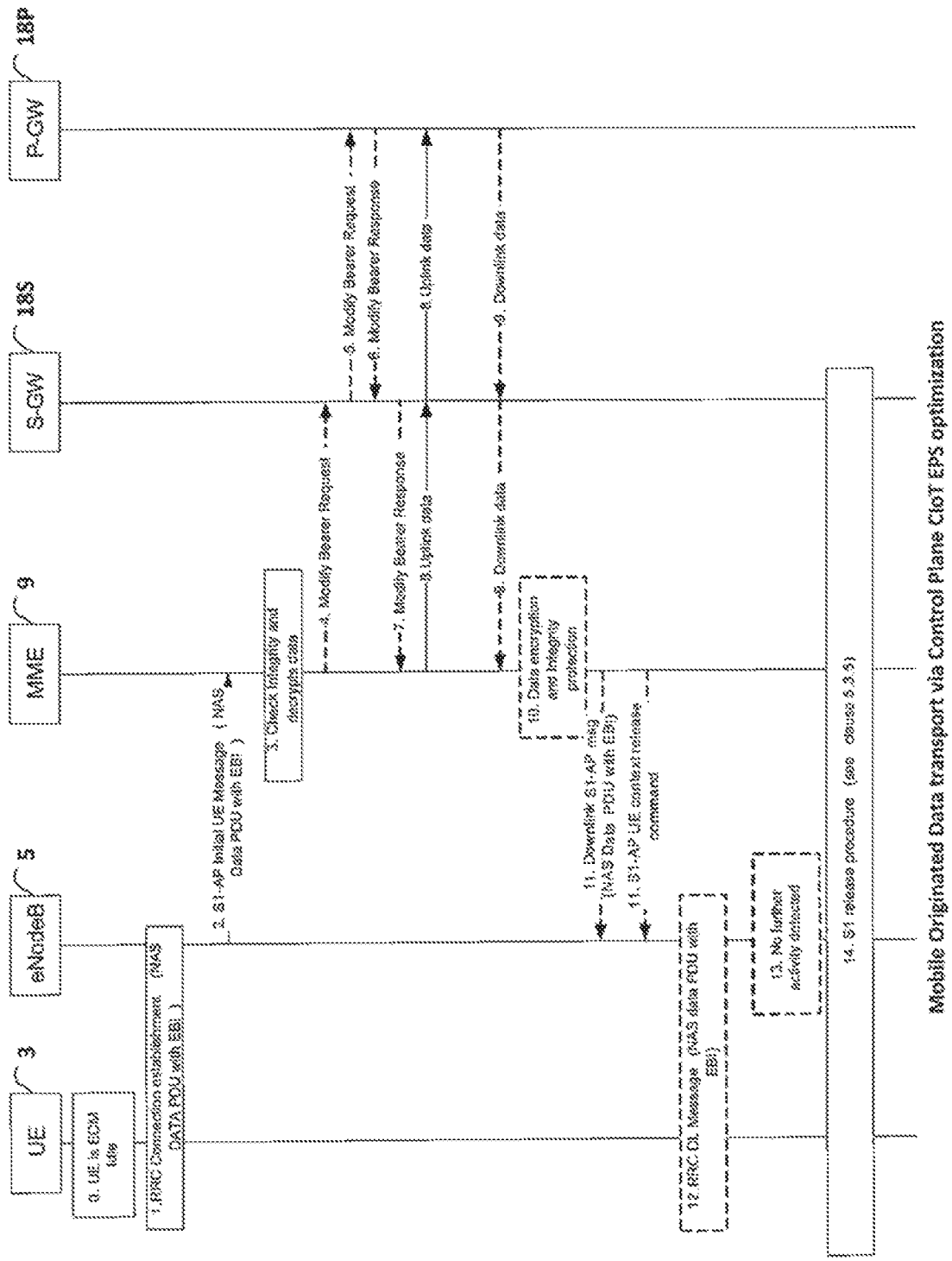
FIG. 1 (from TS23.401, s 5.3.4B.2) is a timing diagram illustrating Mobile Originated data transfer via Control Plane CIoT EPS optimization.
Figure 2:
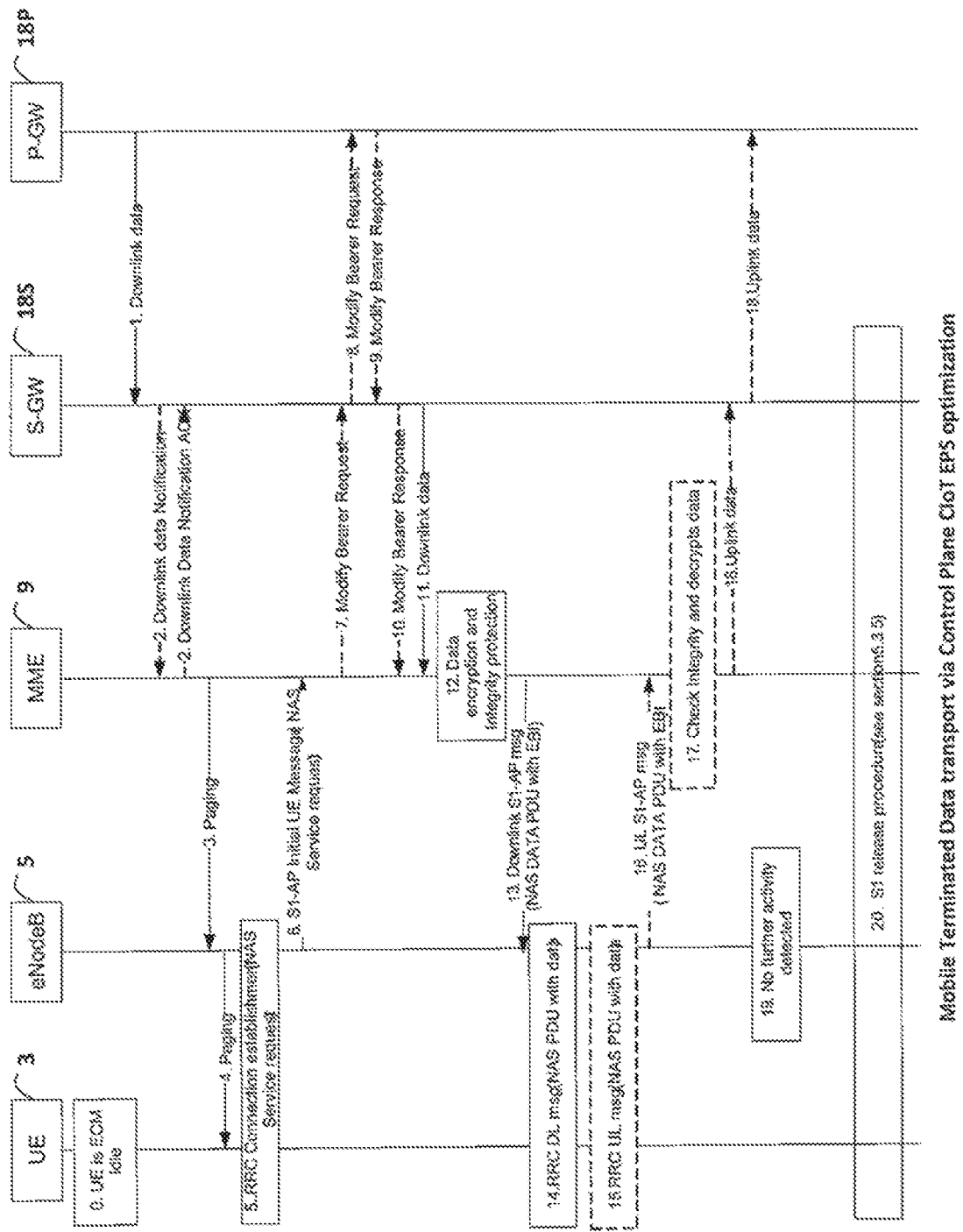
FIG. 2 (from TS23.401, s 5.3.4B.3) is a timing diagram illustrating Mobile Terminated data transfer via Control Plane CIoT EPS optimization.
Figure 3:
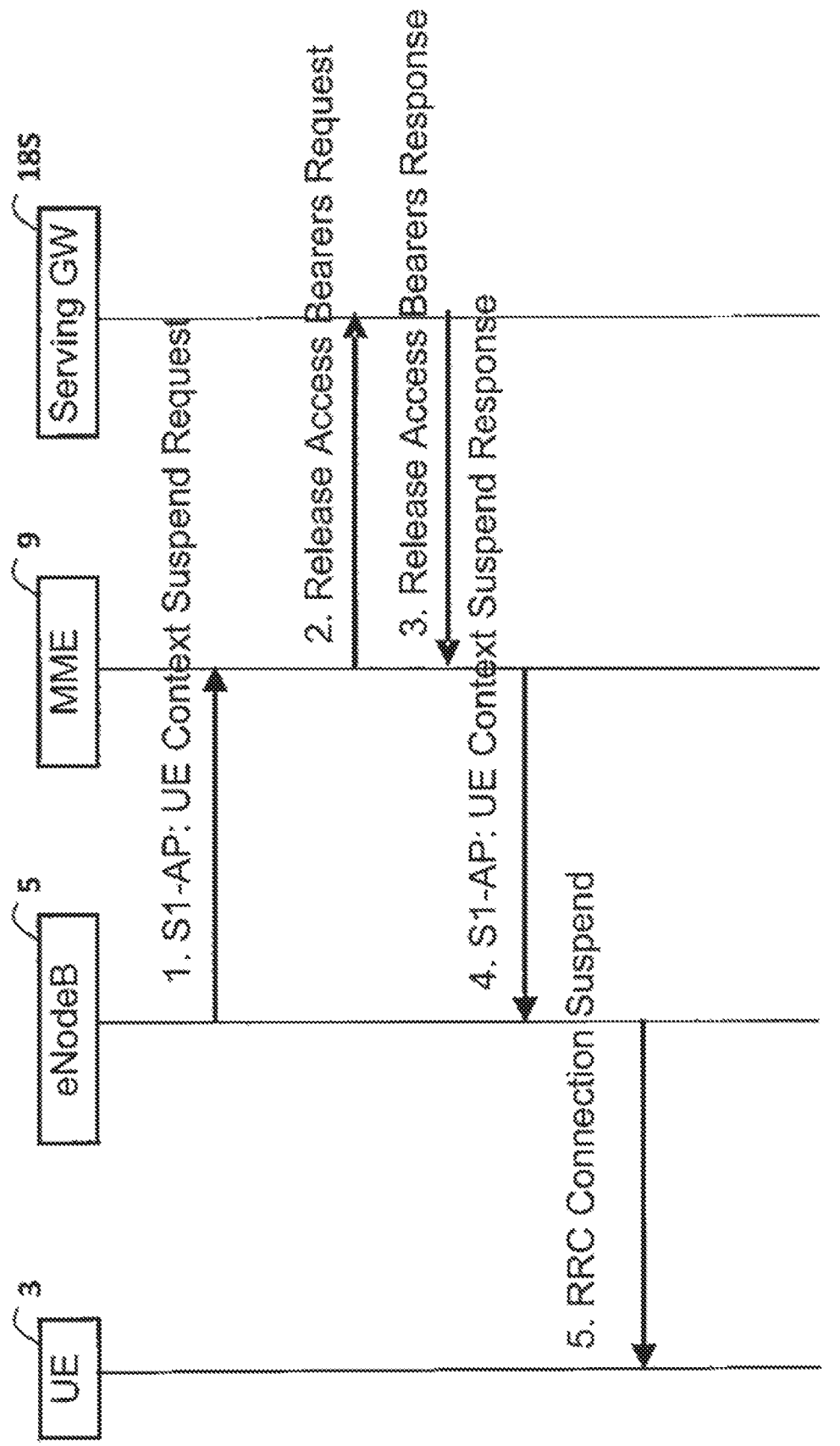
FIG. 3 is a timing diagram illustrating an eNodeB initiated Connection Suspend procedure.
Figure 4:
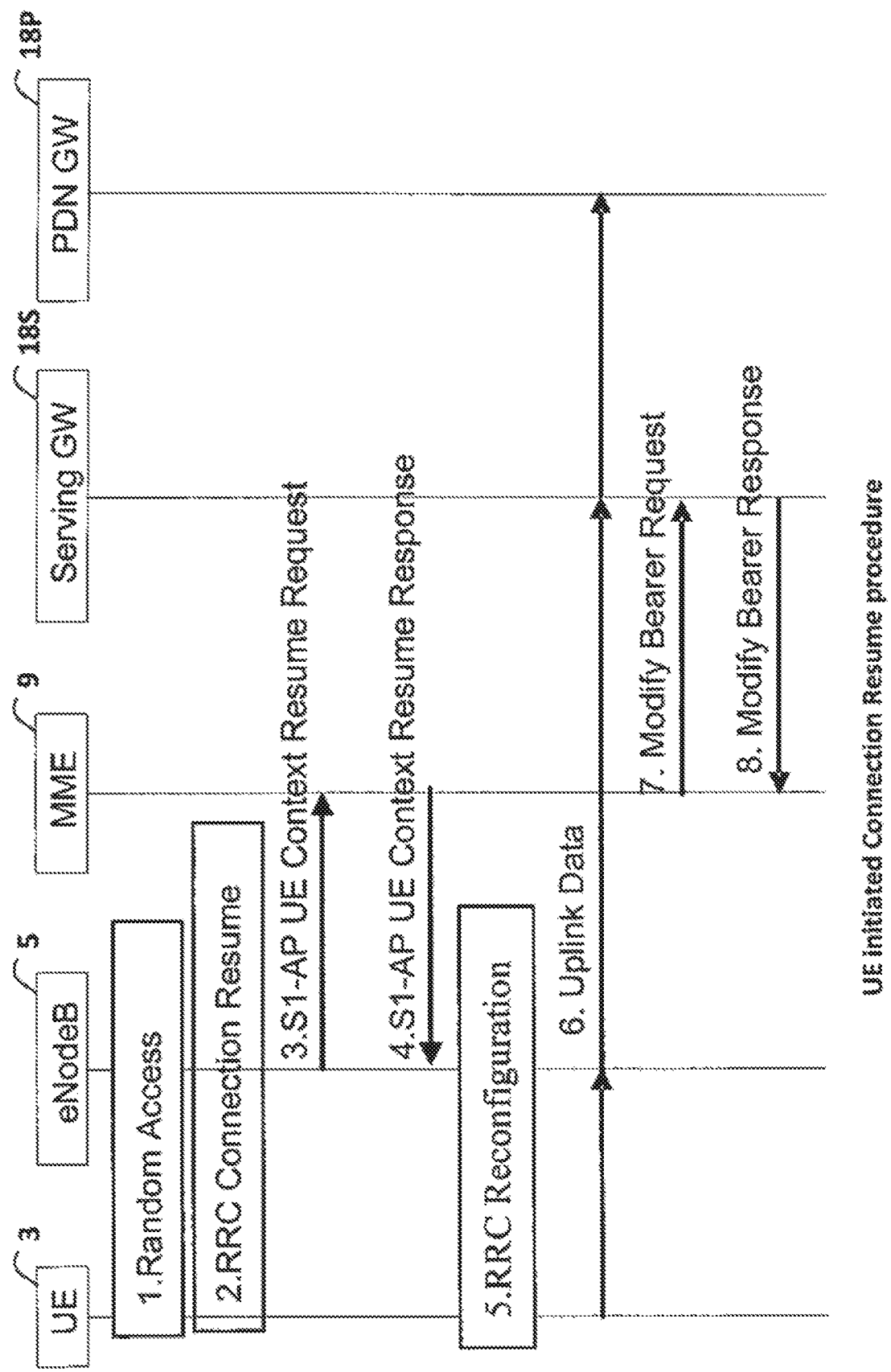
FIG. 4 is a timing diagram illustrating a UE initiated Connection Resume procedure.
Figure 5:
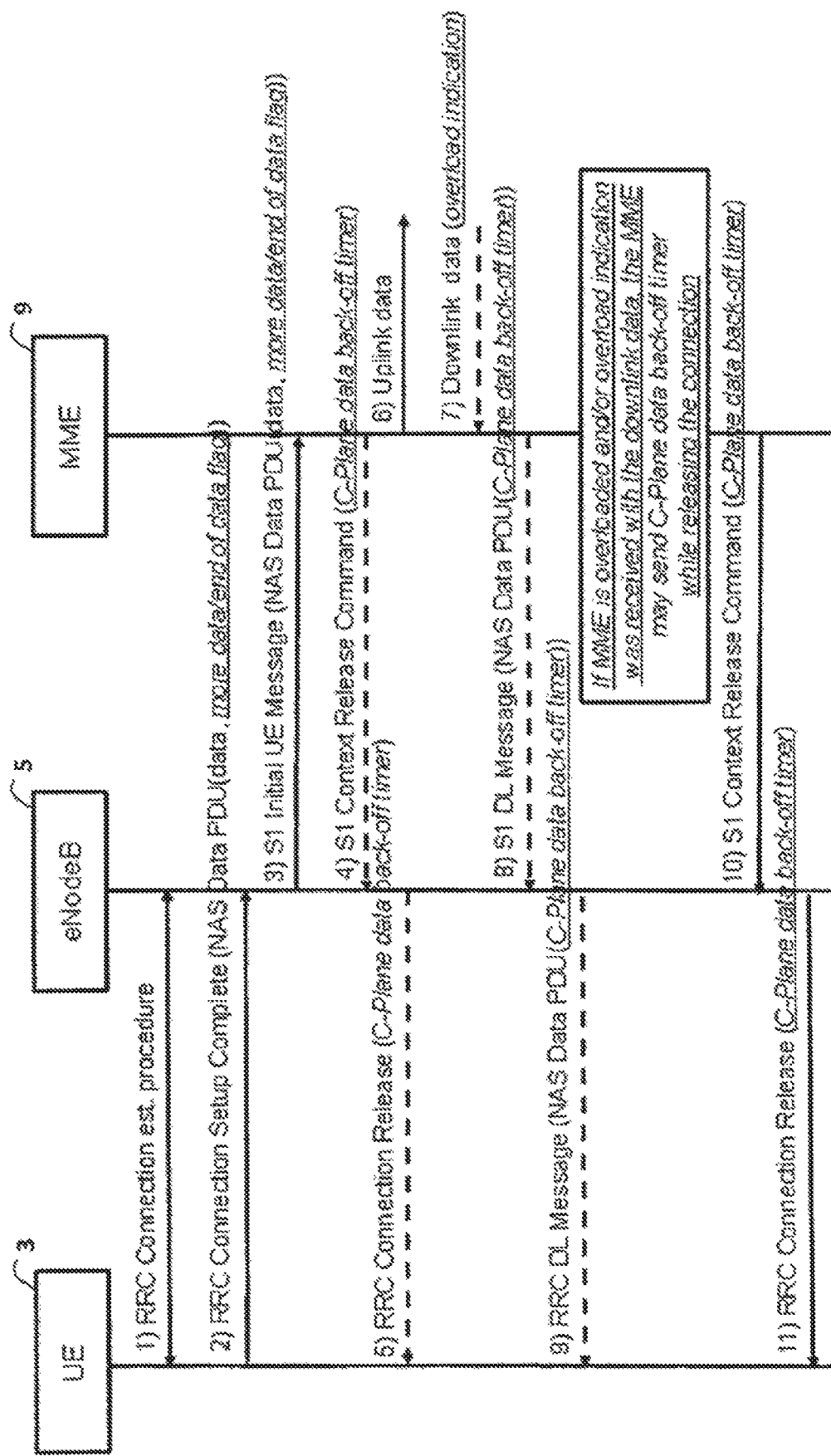
FIG. 5 is a timing diagram illustrating handling of a C-Plane data back-off timer while UE is attached for Control Plane CIoT EPS Optimisation.

One possible solution to restrict the overload of the network (e.g. network control plane entity like MME, SGSN, CIoT-EPC Node and etc.) from data transfer via Control Plane CIoT EPS Optimisation (both, for IP and non-IP data) is to limit the transmission from the UE for a given time. In particular, it is proposed to introduce a back-off timer (called C-Plane data back-off timer or any other name with similar meaning like wait timer and etc) to restrict the UE from attempting data transmission via Control Plane CIoT EPS Optimisation during the duration of this timer. The back-off timer for Control Plane data does not prevent the UE to send a Service Request for any non Control Plane data services. This solution is demonstrated with the message sequence chart in FIG. 5.

1) A UE 3 establishes RRC connection with intention to transmit data via Control Plane CIoT EPS Optimisation.

2) The data is transferred to eNodeB 5 via the NAS data PDU within the RRC Connection Setup Complete message or any other RRC message. If the data is concatenated, the NAS data PDU may contain indication/flag for more data to follow or end of data.

3) The NAS PDU sent in step 2 is relayed to the MME 9 by the eNodeB 5 using a S1 Initial UE message.

4) Option 1 (step 4 & 5): If MME 9 is overloaded (e.g. load reached operator defined data/signalling load threshold), the MME 9 may reject the data transmission via Control Plane CIoT EPS Optimisation by releasing the S1 context with S1 Context Release Command to eNB and the MME 9 may include C-Plane data back-off timer.

Alternatively, in case the UE 3 is using multiple PDN connections, the MME 9 can have different NAS data PDU transmission thresholds for different PDN connections identified by APNs. The different data PDU transmission thresholds via Control Plane CIoT EPS optimisation for different PDN connections can be based a) on operator configurations, or b) local settings in the serving node (MME/SGSN), or c) UE or APN subscriptions, or d) service requirements from $3^{rd}$ party or e) congestion or temporarily unavailability of a U-plane entity like PGW or congestion or temporarily unavailability of the SCEF; f) on any other data limitation per APN. In such case the MME 9 can apply the C-Plane data back-off timer for data transmitted to/from a specific APN. Correspondingly, in the UE 3 the C-Plane data back-off timer is applied only for data transmission via Control Plane CIoT EPS Optimisation to the concerned APN. The UE 3 may transmit data PDUs belonging to other established PDN connections or to initiate the establishment of new PDN connections belonging to APNs different from the APN to which the C-Plane data back-off time applies.

The applicability of the C-Plane data back-off timer for all data PDU transmission or for data PDU transmission per PDN connection can be indicated to the UE 3 either 1) by using different timer types and/or APN indication; or 2) by using the same timer type, but a new indication for timer applicability, or 3) by using the same timer type but including the APN indication in the NAS message from MME/SGSN to the UE 3.

5) Then the eNodeB 5 sends a RRC Connection Release message to the UE 3 in Acknowledged Mode and includes the C-Plane data back-off timer. When the UE 3 receives C-Plane data back-off timer, the UE 3 shall not attempt another for data transfer via Control Plane CIoT EPS Optimisation while the C-Plane data back-off timer is running or until UE re-selects to a cell from another MME service area.

6) Option 2: If the MME 9 is not overloaded, the MME 9 establishes bearers towards the P-GW (if already not established) and forwards further the uplink data.

7) A downlink data or acknowledgment may arrive as a response to the uplink data.

8) If downlink data arrives, it is encapsulated in a NAS data PDU and sent to the eNodeB in a S1 Downlink Message. If MME 9 is now overloaded (e.g. reached operator defined load threshold or an overload indication was received with the downlink data), the MME 9 may include C-Plane data back-off timer in the NAS data PDU.

Alternatively the MME/SGSN can apply the limitation per PDN connection as shown in Option 1) above, e.g. in step 4.

9) The eNodeB 5 sends a RRC Downlink Data message including the downlink data and the C-Plane data back-off timer encapsulated in NAS data PDU.

10) Option 3: Alternatively, if MME 9 is overloaded (e.g. reached operator defined load threshold) or an overload indication was received with the downlink data, the MME 9 may include C-Plane data back-off timer in the S1 Context Release Command to eNodeB 5.

11) Then the eNodeB 5 sends a RRC Connection Release message to the UE 3 in Acknowledged Mode and includes the C-Plane data back-off timer.

When a UE 3 receives C-Plane data back-off timer, the UE 3 shall not attempt another data transmission via Control Plane CIoT EPS Optimisation while the C-Plane data back-off timer is running or until UE re-selects to a cell from another MME service area.

Please note that in the above description the term C-Plane data back-off timer is used, but in general this can be a time period, i.e. a C-Plane data back-off time. After the recipient of the signalling message (e.g. the UE) processes the C-Plane data back-off time, the UE 3 would start an internal C-Plane data back-off timer. Also, the MME/SGSN can start an internal C-Plane data back-off timer in order to monitor or verify the UE's behaviour, whether the UE 3 applies the instructed C-Plane data back-off time.

Please also note that the above described solution may be interpreted is a way that the data PDUs transmission rate via Control Plane CIoT EPS Optimization is limited to "0" (zero) during the time period of the C-Plane data back-off time. In addition to this solution, alternatively the C-plane functional entity (MME/SGSN) can enforce a data PDU transmission rate limitation factor. For example this data PDU transmission rate limitation factor can be 50% or 20%, which means that the UE 3 should reduce the data PDU transmission rate via Control Plane CIoT EPS Optimisation by 50% (compared to the previous allowed transmission rate) for the time period of the C-Plane data back-off time. In another alternative solution, the MME/SGSN may inform the UE about an absolute value of a new data PDU transmission rate via Control Plane CIoT EPS Optimisation, which is supposed to be lower than the currently applied one. This value of a new data PDU transmission rate is applied during the duration of the C-Plane data back-off time. The optional parameters "data PDU transmission rate limitation factor" and "new data PDU transmission rate" described herewith are not shown in FIG. 5, but one or multiple of these new parameters can be included in the messages shown in steps 4/5 or 8/9 or 10/11.

The C-plane functional entity (MME/SGSN) possesses means to derive an appropriate value for the C-Plane data back-off timer. It may depend on various factors as mentioned already in step 4 in FIG. 5.

Figure 6:
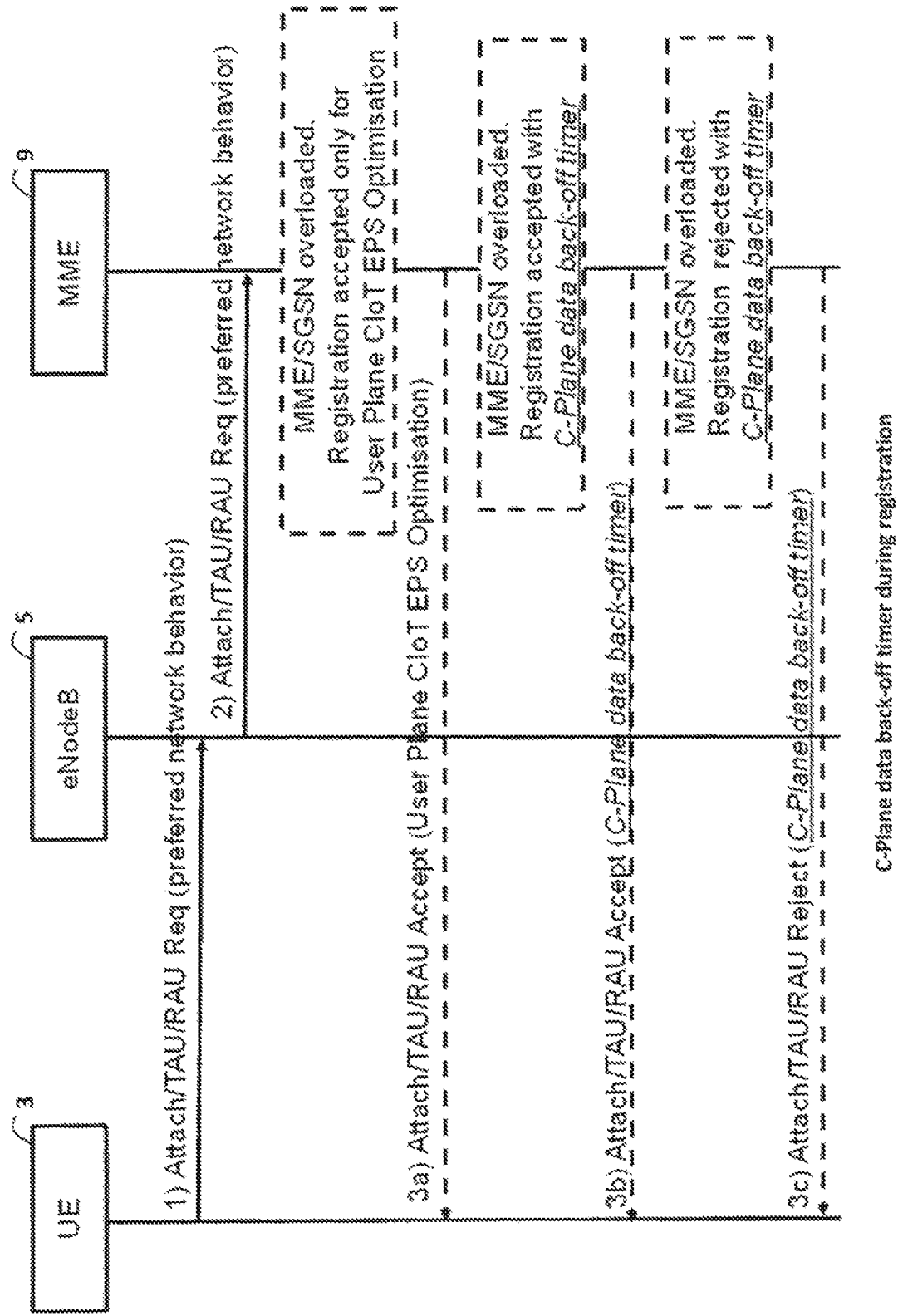
FIG. 6 is a timing diagram illustrating handling of a C-Plane data back-off timer during registration.

Another use case where the C-Plane data back-off timer could be used is to restrict the UEs to Attach/TAU/RAU for data transmission via Control Plane CIoT EPS Optimisation when the MME 9 is overloaded (or close to overload or reached an operator set threshold) and the operator wants to back-off further UEs attaching for data transmission via Control Plane CIoT EPS Optimisation. The MME 9 may consider UE subscription data (e.g UE features like low priority, delay tolerant and etc) in deciding whether and which UEs to restrict from attaching for data transmission via Control Plane CIoT EPS Optimisation for the duration of the C-Plane data back-off timer. This is demonstrated with the message sequence chart in FIG. 6:

1) The UE 3 initiates a registration procedure by transmission of an Attach/TAU/RAU Request. The UE 3 includes the Preferred Network Behaviour parameter where the UE 3 indicates support for Control Plane CIoT EPS Optimisation or User Plane CIoT EPS Optimisation or both. The UE 3 also indicates its preferred CIoT EPS Optimisation (i.e. Control Plane CIoT EPS Optimisation or User Plane CIoT EPS Optimisation)

2) The eNodeB 5 selects an MME 9 that supports the preferred CIoT EPS Optimisation indicated by the UE 3 and forwards the NAS message to that MME 9.

3a) If the UE 3 indicated support for both, Control Plane and User Plane CIoT EPS Optimisation and preference for Control Plane CIoT EPS Optimisation and the MME 9 is overloaded or close to overload (e.g. reached operator defined threshold load), the MME 9 may decide to accept registration for User Plane CIoT EPS Optimisation only. In this case the UE 3 is allowed to initiate data transmission via User Plane CIoT EPS Optimisation only.

3b) If the UE 3 indicated support for both, Control Plane and User Plane CIoT EPS Optimisation and preference for Control Plane CIoT EPS Optimisation and the MME 9 is overloaded or close to overload (e.g reached operator defined threshold load), the MME 9 may decide to accept the registration request for Control Plane EPS Optimisation however, the MME 9 may include in the registration accept (e.g. Attach/TAU/RAU accept) message C-Plane data back-off timer in order to restrict the UE 3 from attempts for data transmission via Control Plane CIoT EPS Optimisation for the duration of the C-Plane data back-off timer. The UE 3 is allowed for data transmission via User Plane CIoT EPS Optimisation if registered for it. The UE 3 shall not initiate data transfer via Control Plane CIoT EPS Optimisation until the expiry of the C-Plane data back-off timer.

3c) If the UE 3 indicated support for both, Control Plane and User Plane CIoT EPS Optimisation and preference for Control Plane CIoT EPS Optimisation and the MME 9 is overloaded or close to overload (e.g reached operator defined threshold load), the MME 9 may decide to reject registration for Control Plane CIoT EPS Optimisation and it may include C-Plane data back-off timer in order to restrict the UE 3 from further attempts to register for Control Plane CIoT EPS Optimisation for the duration of the C-Plane data back-off timer.

Solution 1 is equally applicable as for 3G and 2G mobile network and terminals where SGSN stands for MME and RNC/BS stands for eNodeB, as well for 5G mobile networks and terminals.

Solution 2—C-Plane CIoT Data Overload Message

Figure 7:
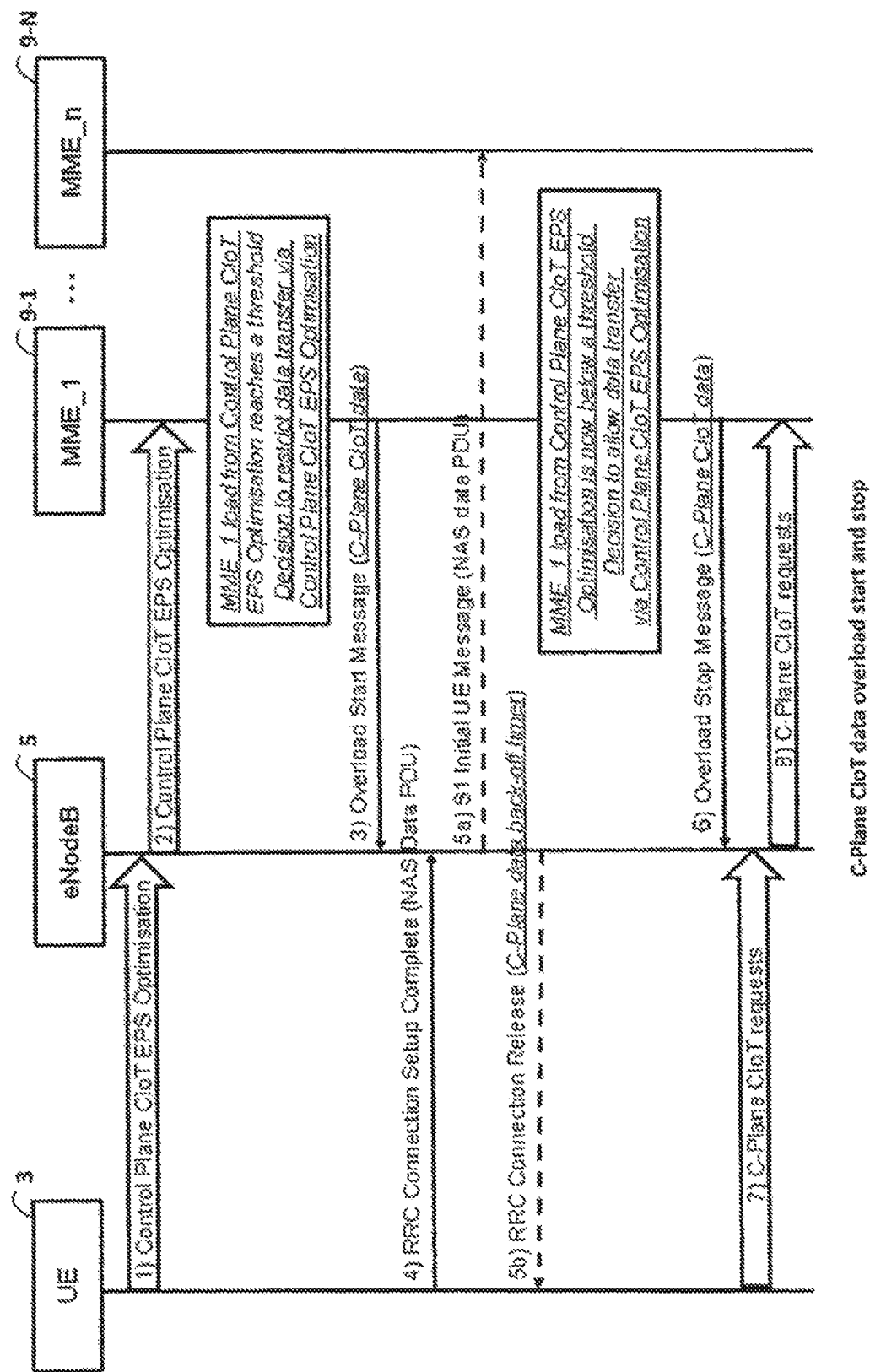
FIG. 7 is a timing diagram illustrating C-Plane CIoT data overload start and stop.

Solution 2 proposes that if the control plane entity of the network (e.g. MME or SGSN or CIoT-EPC Control Node and etc) gets overloaded (e.g. the load reaches a threshold set by the mobile network operator) and the main source for the overload is from data transfer via Control Plane CIoT EPS Optimisation, the MME may send Overload Start Message to eNodeB with C-Plane CIoT data parameter (or any other parameter with similar meaning) so that the eNodeB does not select that MME for data transfer via Control Plane CIoT EPS Optimisation or eNodeB rejects a request for data transfer via Control Plane CIoT EPS Optimisation if no other MME with that capability is available. This solution is demonstrated on FIG. 7.

1) Requests from UE(s) 3 for data transfer via Control Plane CIoT EPS Optimisation. The Control Plane CIoT EPS Optimisation preference is indicated within the RRC signalling (e.g RRC Connection Setup Complete or any other RRC message).

2) The eNodeB 5 forwards the requests from the UE(s) to MME_1 9-1 which is Control Plane CIoT Optimisation capable.

3) At some stage MME_1 9-1 gets overloaded from data transfer via Control Plane CIoT EPS Optimisation (i.e load from data transfer via Control Plane CIoT EPS Optimisation reaches a threshold defined by the operator). Then the MME_1 9-1 may send Overload Start message to eNodeB 5 and includes C-Plane CIoT data parameter meaning any further requests for data transfer via Control Plane CIoT EPS Optimisation shall not be forwarded by eNodeB 5 to MME_1 9-1 until MME_1 9-1 sends Overload Stop message with C-Plane CIoT data parameter in it.

4) Another UE 3 establishes a RRC connection with intention to transmit data via Control Plane CIoT EPS Optimisation. The data is transferred to eNodeB 5 via the NAS data PDU within the RRC Connection Setup Complete message or any other RRC message.

5a) As MME_1 9-1 is now overloaded (e.g. reached a threshold set by the operator) the eNodeB 5 starts routing all requests for data transfer via Control Plane CIoT EPS Optimisation to another MME that is Control Plane CIoT EPS Optimisation capable (e.g. MME_n 9-N) via S1 Initial UE message, for example.

5b) If no other MME capable of Control Plane CIoT Optimisation is available, the eNodeB 5 rejects the request from UE 3 by releasing RRC connection with RRC Connection Release message and the eNodeB may include C-Plane data back-off timer. When a UE 3 receives C-Plane data back-off timer, the UE 3 shall not attempt another data transfer via Control Plane CIoT EPS Optimisation while the C-Plane data back-off timer is running or until UE re-selects to a cell from another MME service area.

6) After some time the load from data transfer via Control Plane CIoT EPS Optimisation in MME_1 9-1 decreases below the overload threshold. Then, MME_1 9-1 send Overload Stop message including C-Plane CIoT data parameter (or any other parameter with similar meaning) to indicate that the overload from data transfer via Control Plane CIoT EPS Optimisation is over. When receives this message the eNodeB shall start considering MME_1 9-1 again when selecting an MME for data transfer via Control Plane CIoT EPS Optimisation.

7-8) eNodeB 5 starts routing the requests for data transfer via Control Plane CIoT EPS Optimisation to MME_1 9-1.

Solution 3—Designated Weight Factors for Data Transfer Via Control Plane CIoT EPS Optimisation and User Plane CIoT EPS Optimisation Solution 3 proposes to introduce weight factors for data transfer via Control Plane CIoT EPS Optimisation (C-Plane weight factor) and User Plane CIoT EPS Optimisation (U-Plane weight factor). This would allow for higher granularity Load balancing which would consider the MME load from both types of communication and also will allow to control the balance between data transfer via Control Plane CIoT EPS Optimisation and data transfer via User Plane CIoT EPS Optimisation.

Figure 8:
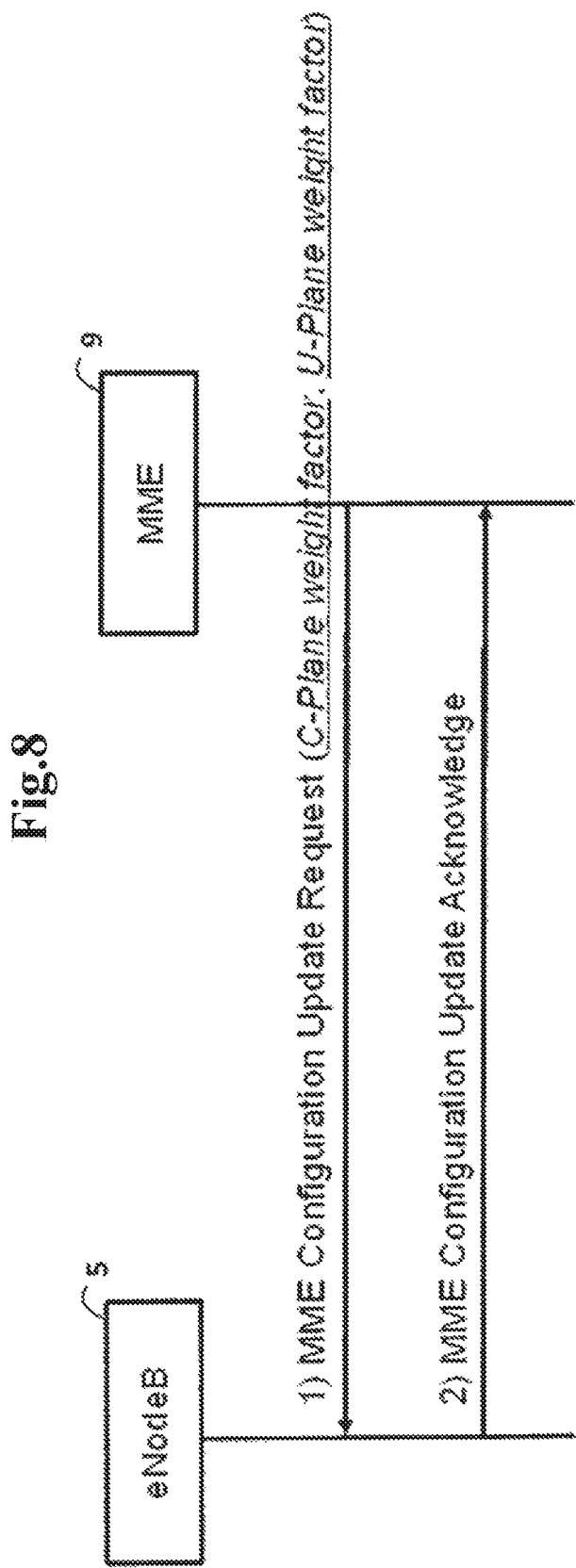
FIG. 8 is a timing diagram illustrating C-Plane and U-Plane CIoT weight factors configuration via MME Configuration Update procedure.
Figure 9:
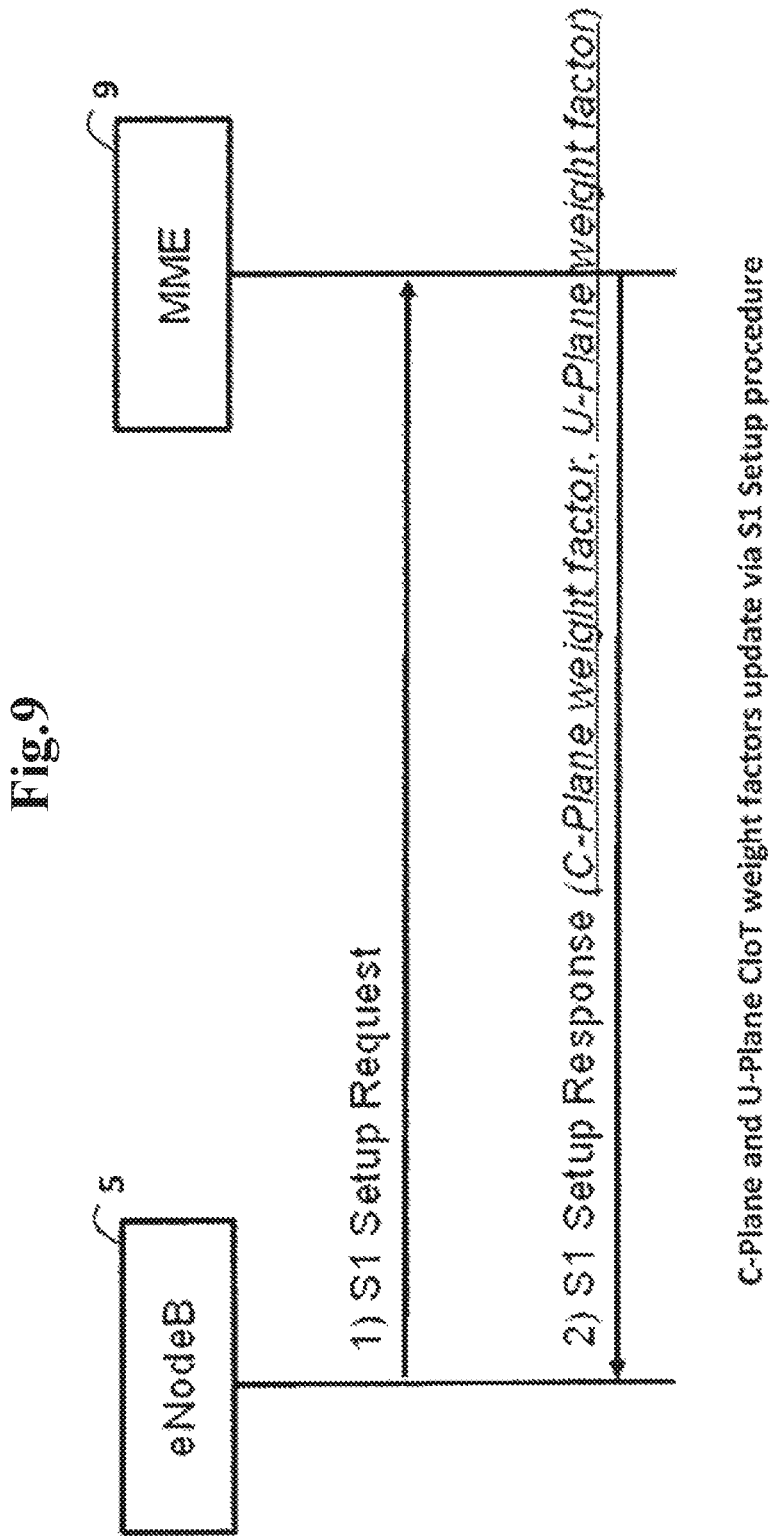
FIG. 9 is a timing diagram illustrating C-Plane and U-Plane CIoT weight factors update via S1 Setup procedure.

FIG. 8 and FIG. 9 demonstrate the way the new C-Plane weight factor and U-Plane weight factor would be configured in the eNodeB using the existing MME Configuration Update procedure and S1 Setup procedure.

The eNodeB 5 uses the C-Plane weight factor and U-Plane weight factor for load balancing (MME selection) when a request from a UE for data transfer via Control Plane CIoT EPS Optimisation or User Plane CIoT EPS Optimisation is received.

Technical Improvements Compared to Existing Technologies

Solution 1:

C-Plane data back-off timer—New type back-off timer used with AS and NAS signaling to restrict the load from data transfer via Control Plane CIoT EPS Optimisation. The MME 9 returns C-Plane data back-off timer to a UE via NAS or RRC signaling when the MME load from data transfer via Control Plane CIoT EPS Optimisation reaches a threshold set by the mobile operator. When UE receives C-Plane data back-off timer the UE shall not attempt a data transfer via Control Plane CIoT EPS Optimisation until the expiry of C-Plane data back-off timer or until it reselects to a cell from different MME service area.

more data to follow or end of data flag—A new flag/parameter indication from the UE in the RRC or NAS signalling messages to indicate the last NAS data PDU when transferring concatenated NAS data PDUs via Control Plane CIoT EPS Optimisation.

overload indication—A new parameter in the downlink data. If downlink data with overload indication arrives at MME the MME may include C-Plane data back-off timer in the NAS data PDU towards the UE via AS or RRC signalling. When UE receives C-Plane data back-off timer the UE shall not attempt a data transfer via Control Plane CIoT EPS Optimisation until the expiry of C-Plane data back-off timer or until it reselects to a cell from different MME service area.

Solution 2:

C-Plane CIoT data—a new parameter in the Overload Start and Overload Stop messages. When an MME 9 gets overloaded from data transfer via Control Plane CIoT EPS Optimisation (i.e load from data transfer via Control Plane CIoT EPS Optimisation reaches a threshold defined by the operator), the MME 9 may send Overload Start message to eNodeB 5 and includes C-Plane CIoT data parameter meaning any further requests for data transfer via Control Plane CIoT EPS Optimisation shall not be forwarded by eNodeB 5 to this MME 9 until the MME 9 sends Overload Stop message with C-Plane CIoT data parameter, meaning the MME 9 is not overloaded anymore.

Solution 3:

New C-Plane weight factor and U-Plane weight factor—to allow for higher granularity Load Balancing which would consider the MME 9 load from both types of data transfer (via Control Plane CIoT EPS Optimisation and User Plane CIoT EPS Optimisation) and also to allow to control the balance between Control Plane CIoT EPS Optimisation data and User Plane CIoT EPS Optimisation data. The new C-Plane weight factor and U-Plane weight factor would be configured in the eNodeB 5 by the MME 9 using the existing MME Configuration Update procedure and S1 Setup procedure. The eNodeB 5 uses the C-Plane weight factor and U-Plane weight factor for load balancing (MME selection) when a request from a UE for data transfer via Control Plane CIoT EPS Optimisation or User Plane CIoT EPS Optimisation is received.

System Overview

Figure 10:
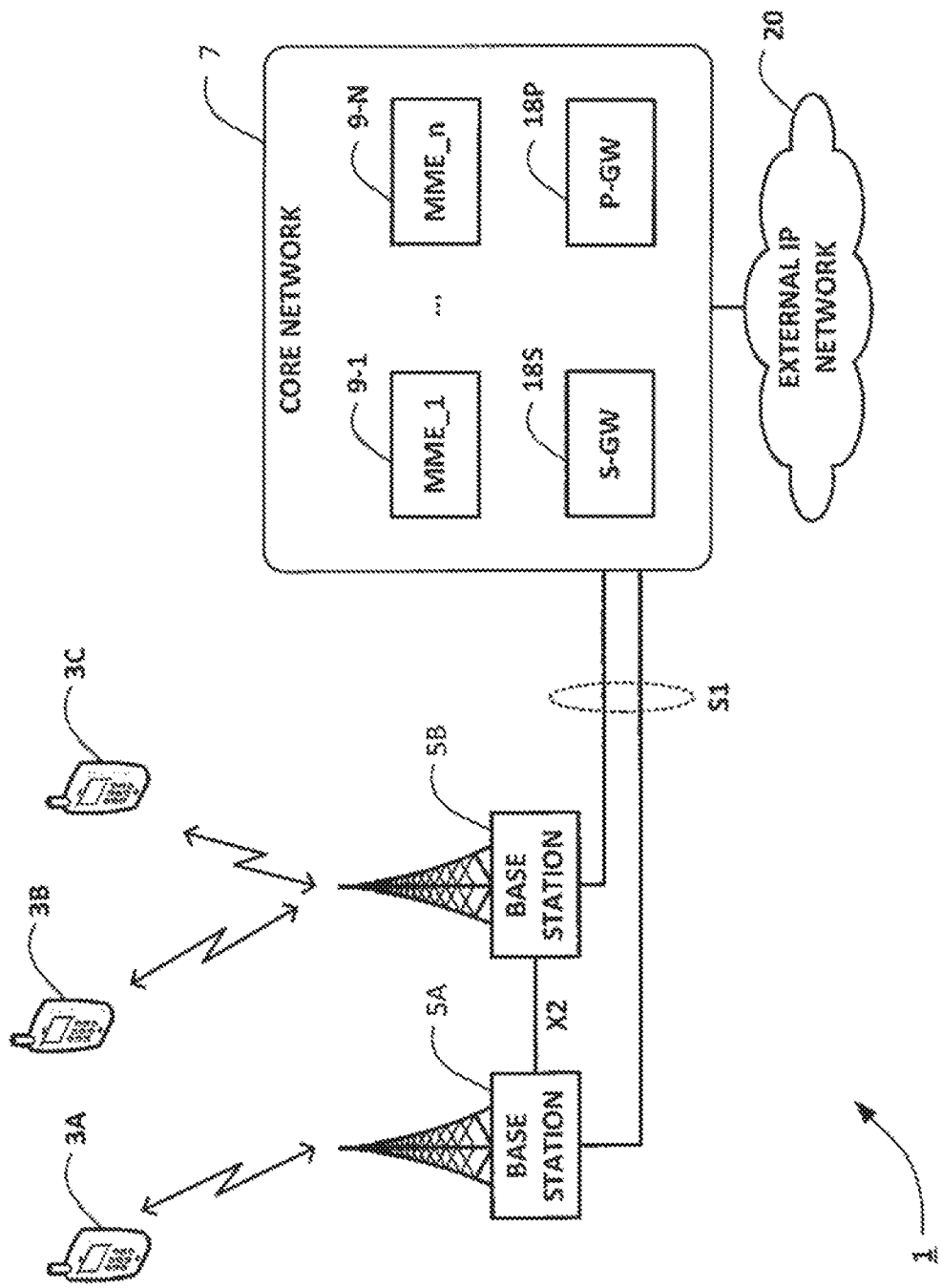
FIG. 10 illustrates schematically a cellular (tele)communication system to which embodiments of the disclosure may be applied.

FIG. 10 schematically illustrates a mobile (cellular or wireless) telecommunication network 1 in which users of mobile devices 3A to 3C can communicate with each other and other users via E-UTRAN base stations 5A, 5B and a core network 7 using an E-UTRA radio access technology (RAT). As those skilled in the art will appreciate, whilst three mobile devices 3 and two base stations 5 are shown in FIG. 10 for illustration purposes, the system, when implemented, will typically include other base stations and mobile devices.

As is well known, a mobile device 3 may enter and leave the areas (i.e. radio cells) served by the base stations 5 as the mobile device 3 is moving around in the geographical area covered by the telecommunication system 1. In order to keep track of the mobile device 3 and to facilitate movement between the different base stations 5, the core network 7 comprises a number of mobility management entities (MMEs) 9-1 to 9-N.

The MMEs 9 are in communication with the base stations 5 coupled to the core network 7. The core network 7 also one or more gateways 18, such as a serving gateway (S-GW) 18S and/or a packet data network gateway (P-GW) 18P. Although shown separately, it will be appreciated that the functionalities of the S-GW 18S and the P-GW 18P may be provided by a single network entity, if appropriate.

The mobile devices 3 and their respective serving base stations 5 are connected via an LTE air interface, the so-called "Uu" interface. The base stations 5 are connected to each other via a so-called "X2" interface. Each base station 5 is also connected to the core network nodes (such as one of the MMEs 9 and the S-GW 18S) via a so-called "S1" interface. From the core network 7, connection to an external IP network 20, such as the Internet, is also provided via the P-GW 18P. Although not shown in FIG. 10, the core network may also include further nodes, such as a home subscriber server (HSS) and/or the like.

Mobile Device

Figure 11:
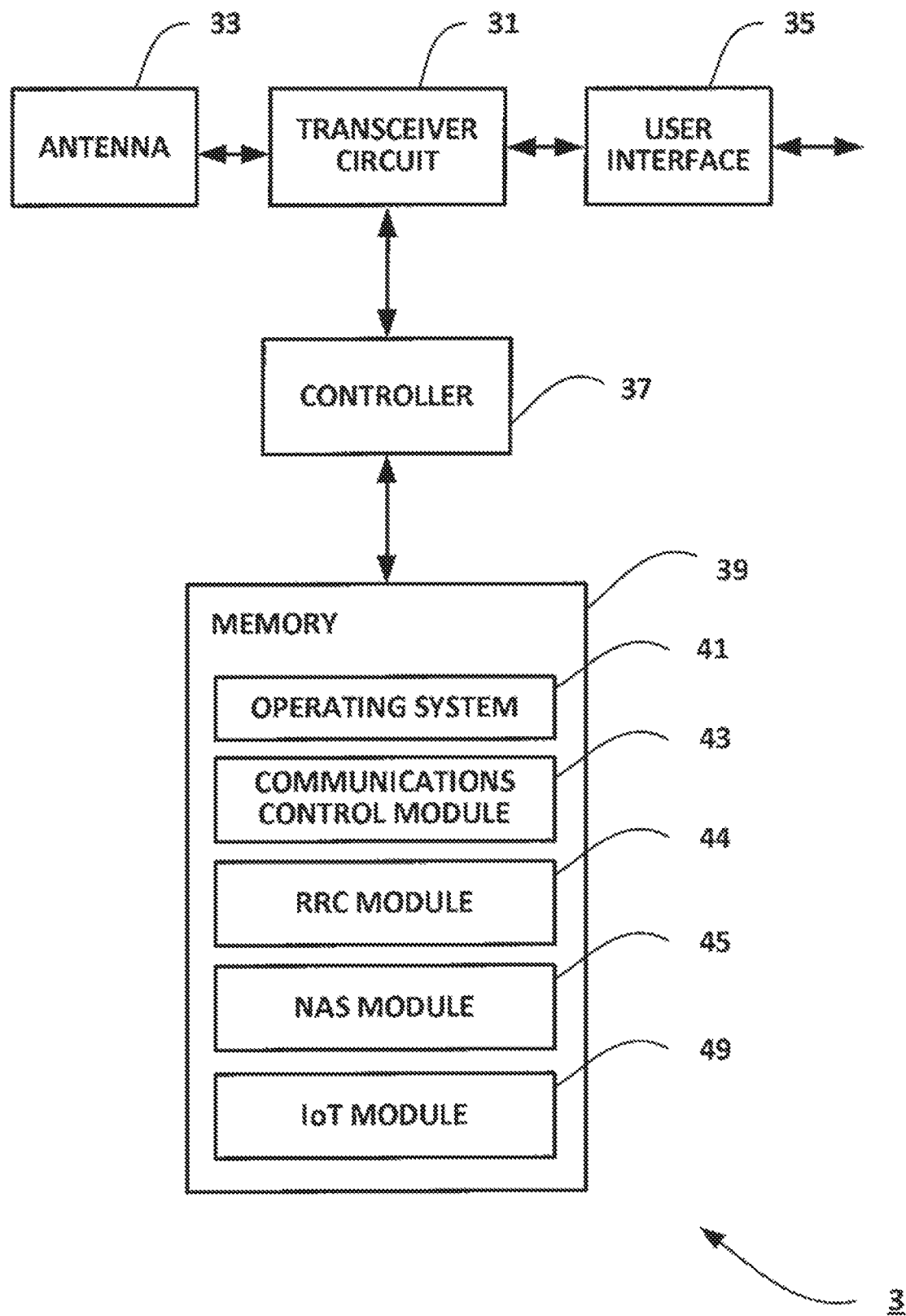
FIG. 11 is a block diagram of a mobile device forming part of the system shown in FIG. 10.

FIG. 11 is a block diagram illustrating the main components of one of the mobile devices 3 (or IoT device) shown in FIG. 10. As shown, the mobile device 3 has a transceiver circuit 31 that is operable to transmit signals to and to receive signals from a base station 5 via one or more antenna 33. The mobile device 3 has a controller 37 to control the operation of the mobile device 3. The controller 37 is associated with a memory 39 and is coupled to the transceiver circuit 31. Although not necessarily shown in FIG. 11, the mobile device 3 will of course have all the usual functionality of a conventional mobile device 3 (such as a user interface 35) and this may be provided by any one or any combination of hardware, software and firmware, as appropriate. Software may be pre-installed in the memory 39 and/or may be downloaded via the telecommunication network or from a removable data storage device (RMD), for example.

The controller 37 controls overall operation of the mobile device 3 by, in this example, program instructions or software instructions stored within the memory 39. As shown, these software instructions include, among other things, an operating system 41, a communications control module 43, an RRC module 44, a NAS module 45, and an IoT module 49.

The communications control module 43 controls the communication between the mobile device 3 and the base station 5. The communications control module 43 also controls the separate flows of control data (Control Plane) and user data (User Plane, both uplink and downlink) that are to be transmitted to the base station 5 and other nodes (via the base station 5) such as the MME 9 and/or the S-GW 18S.

The RRC module 44 is operable to generate, send and receive signalling messages formatted according to the RRC standard. For example, such messages are exchanged between the mobile device 3 and its serving base station 5. The RRC messages may include, for example, messages relating to the random access procedure and/or the RRC connection establishment/reconfiguration, and the RRC messages may also include messages comprising control data (e.g. NAS messages) to be relayed by the serving base station 5 to the MME 9.

The NAS module 45 is operable to generate, send and receive signalling messages formatted according to the NAS protocol. For example, such messages are exchanged (via the base stations 5) between the mobile device 3 and the MMEs 9. The NAS messages may include, for example, the NAS messages comprising control data relating to mobility of a mobile device 3, e.g. control data for registering the mobile device 3 with an MME 9.

The IoT module 49 is responsible for facilitating communications relating to 'internet of things' and/or other machine-type communication applications (including cellular IoT, narrowband-IoT, and wideband-IoT, if appropriate). The IoT module 49 is also responsible for managing the user plane and control plane relating to IoT communications, including user plane/control plane optimisation and associated signalling.

Base Station

Figure 12:
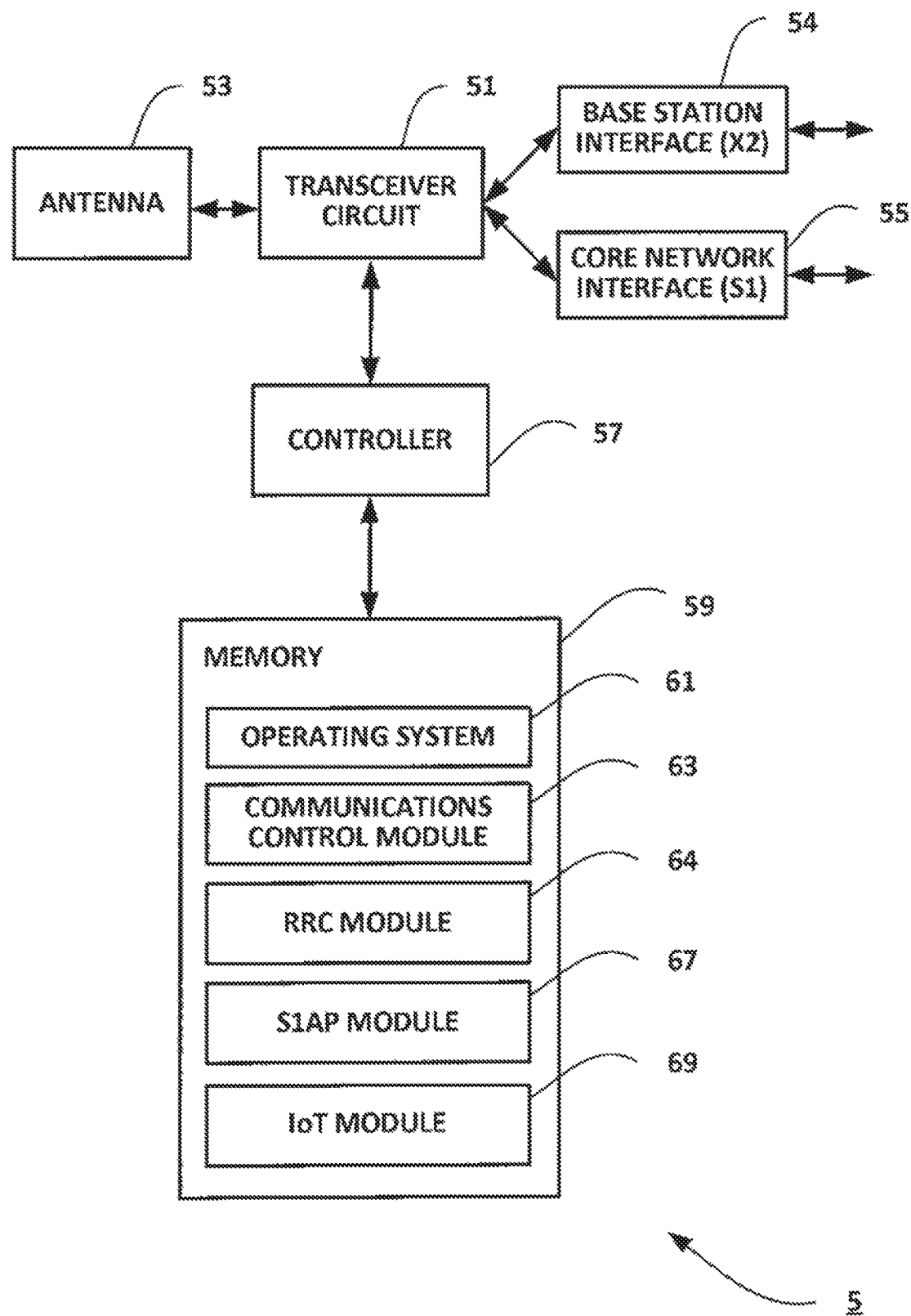
FIG. 12 is a block diagram of a base station forming part of the system shown in FIG. 10.

FIG. 12 is a block diagram illustrating the main components of one of the base stations 5 shown in FIG. 10. As shown, the base station 5 has a transceiver circuit 51 for transmitting signals to and for receiving signals from the mobile devices 3 via one or more antenna 53, a base station interface (X2) 54 for transmitting signals to and for receiving signals from other base stations, and a core network interface (S1) 55 for transmitting signals to and for receiving signals from the core network entities (e.g. the MMEs 9 and the S-GW 18). The base station 5 has a controller 57 to control the operation of the base station 5. The controller 57 is associated with a memory 59. Although not necessarily shown in FIG. 12, the base station 5 will of course have all the usual functionality of a cellular telephone network base station and this may be provided by any one or any combination of hardware, software and firmware, as appropriate. Software may be pre-installed in the memory 59 and/or may be downloaded via the communication network 1 or from a removable data storage device (RMD), for example. The controller 57 is configured to control the overall operation of the base station 5 by, in this example, program instructions or software instructions stored within the memory 59. As shown, these software instructions include, among other things, an operating system 61, a communications control module 63, an RRC module 64, an S1AP module 67, and an IoT module 69.

The communications control module 63 controls the communication between the base station 5 and the mobile devices 3 and other network entities (e.g. the MMEs 9/S-GW 18S) that are connected to the base station 5. The communications control module 63 also controls the separate flows of uplink/downlink user traffic and control data for the mobile devices 3 associated with this base station 5.

The RRC module 64 is operable to generate, send and receive signalling messages formatted according to the RRC standard. For example, such messages are exchanged between the base station 5 and the mobile devices 3 that are associated with this base station 5. The RRC messages may include, for example, messages relating to the random access procedure and/or the RRC connection establishment/reconfiguration, and the RRC messages may also include messages comprising control data (e.g. NAS messages) to be relayed by the serving base station 5 to the MME 9.

The S1AP module 67 is operable to generate, send and receive signalling messages formatted according to the S1 application protocol (S1AP) standard. For example, such S1AP messages are exchanged between the base station 5 and the MMEs 9 connected to this base station 5. The S1AP messages may include, for example, messages carrying NAS signalling, S1 setup messages, and associated responses.

The IoT module 69 is responsible for facilitating communications relating to 'internet of things' and/or other machine-type communication applications (including cellular IoT, narrowband-IoT, and wideband-IoT, if appropriate). The IoT module 69 is also responsible for managing the user plane and control plane (for user equipment having IoT functionality) relating to IoT communications, including user plane/control plane optimisation and associated signalling.

Mobility Management Entity

Figure 13:
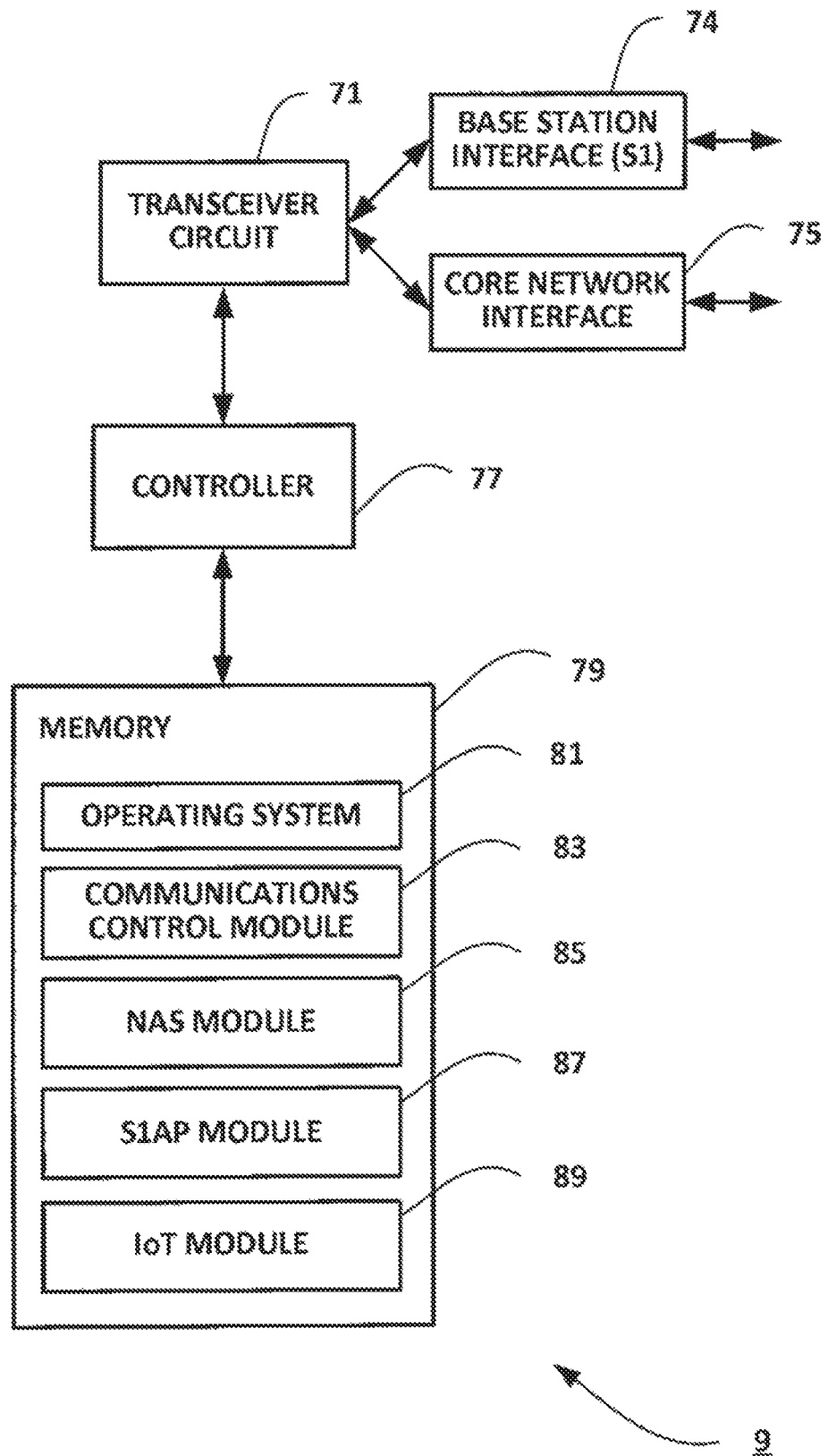
FIG. 13 is a block diagram of a mobility management entity forming part of the system shown in FIG. 10.

FIG. 13 is a block diagram illustrating the main components of one of the MMEs 9 shown in FIG. 10. As shown, the MME 9 has a transceiver circuit 71, a base station interface (S1) 74 for transmitting signals to and for receiving signals from the base stations 5, and a core network interface 75 for transmitting signals to and for receiving signals from other core network nodes (such as other MMEs 9 and the gateways 18). The MME 9 has a controller 77 to control the operation of the MME 9. The controller 77 is associated with a memory 79.

Software may be pre-installed in the memory 79 and/or may be downloaded via the communication network 1 or from a removable data storage device (RMD), for example. The controller 77 is configured to control the overall operation of the MME 9 by, in this example, program instructions or software instructions stored within the memory 79. As shown, these software instructions include, among other things, an operating system 81, a communications control module 83, a non-access stratum (NAS) module 85, an S1AP module 87, and an IoT module 89.

The communications control module 83 controls the communication between the MME 9 and other network entities that are connected to the MME 9 (e.g. the base stations 5, other MMEs 9, the gateways 18, and any mobile devices 3 when connected to one of the base stations 5).

The NAS module 85 is operable to generate, send and receive signalling messages formatted according to the NAS protocol. For example, such messages are exchanged (via the base stations 5) between the MME 9 and the mobile devices 3 that are associated with this MME 9. The NAS messages may include, for example, the NAS messages comprising control data relating to mobility of a mobile device 3, e.g. control data for registering the mobile device 3 with the MME 9.

The S1AP module 87 is operable to generate, send and receive signalling messages formatted according to the S1 application protocol (S1AP) standard. For example, such messages are exchanged between the MME 9 and the base stations 5 connected to this MME 9. The S1AP messages may include, for example, messages carrying NAS signalling, S1 setup messages, and associated responses.

The IoT module 89 is responsible for facilitating communications relating to 'internet of things' and/or other machine-type communication applications (including cellular IoT, narrowband-IoT, and wideband-IoT, if appropriate). The IoT module 89 is also responsible for managing the user plane and control plane (for user equipment having IoT functionality) relating to IoT communications, including user plane/control plane optimisation and associated signalling.

Gateway

Figure 14:
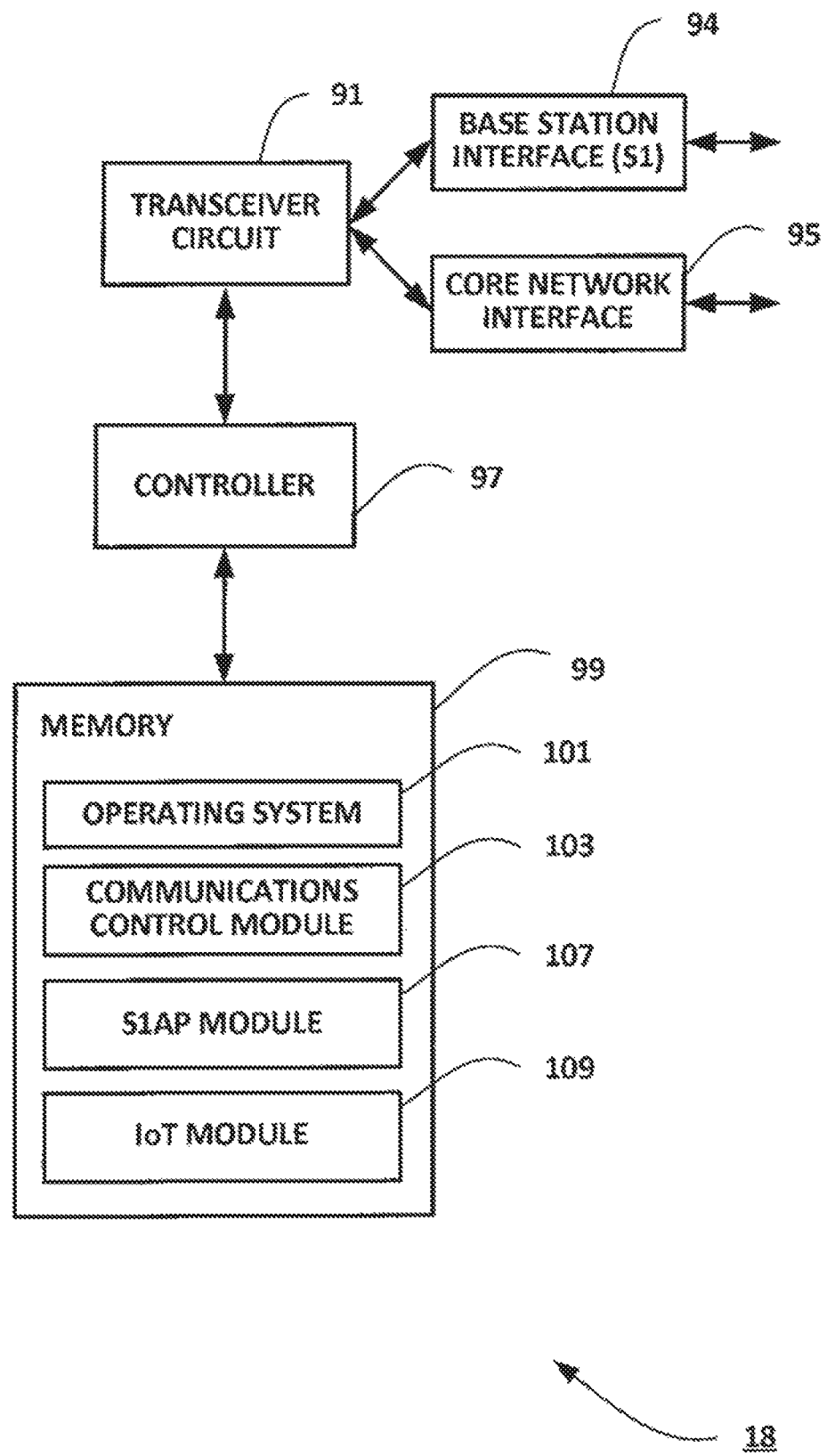
FIG. 14 is a block diagram of a gateway forming part of the system shown in FIG. 10.

FIG. 14 is a block diagram illustrating the main components of one of the gateways 18 shown in FIG. 10. As shown, the gateway 18 has a transceiver circuit 91, a base station interface (S1) 94 for transmitting signals to and for receiving signals from the base stations 5, and a core network interface 95 for transmitting signals to and for receiving signals from other core network nodes (such as the MMEs 9 and other gateways 18). The gateway 18 has a controller 97 to control the operation of the gateway 18. The controller 97 is associated with a memory 99.

Software may be pre-installed in the memory 99 and/or may be downloaded via the communication network 1 or from a removable data storage device (RMD), for example. The controller 97 is configured to control the overall operation of the gateway 18 by, in this example, program instructions or software instructions stored within the memory 99. As shown, these software instructions include, among other things, an operating system 101, a communications control module 103, an S1AP module 107, and an IoT module 89.

The communications control module 103 controls the communication between the gateway 18 and other network entities that are connected to the gateway 18 (e.g. the base stations 5, MMEs 9, other gateways 18, and any mobile devices 3 when connected to one of the base stations 5).

The S1AP module 107 is operable to generate, send and receive signalling messages formatted according to the S1 application protocol (S1AP) standard. For example, such messages are exchanged between the gateway 18 and the base stations 5 connected to this gateway 18.

The IoT module 109 is responsible for facilitating communications relating to 'internet of things' and/or other machine-type communication applications (including cellular IoT, narrowband-IoT, and wideband-IoT, if appropriate). The IoT module 109 is also responsible for managing the user plane and control plane (for user equipment having IoT functionality) relating to IoT communications, including user plane/control plane optimisation and associated signalling.

Modifications and Alternatives

Detailed example embodiments have been described above. As those skilled in the art will appreciate, a number of modifications and alternatives can be made to the above example embodiments whilst still benefiting from the disclosure embodied therein. By way of illustration only a number of these alternatives and modifications will now be described.

In the above example embodiments, a 3GPP radio communications (radio access) technology is used. However, any other radio communications technology (i.e. WLAN, Wi-Fi, WiMAX, Bluetooth, etc.) can be used for managing transmissions of IoT devices in accordance with the above example embodiments. The above example embodiments are also applicable to 'non-mobile' or generally stationary user equipment.

Examples of IoT Applications

Some examples of Internet of Things (or MTC) applications are listed in the following table (source: 3GPP TS 22.368 V13.1.0, Annex B). This list is not exhaustive and is intended to be indicative of the scope of Internet of Things/machine-type communication applications.

TABLE 2

| Service Area | IoT applications |
| --- | --- |
| Security | Surveillance systems |
| | Backup for landline |
| | Control of physical access (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote Maintenance/Control | Sensors |
| | Lighting |
| | Pumps |
| | Valves |
| | Elevator control |
| | Vending machine control |

TABLE 2-continued

| Service Area | IoT applications |
| --- | --- |
| | Vehicle diagnostics |
| Metering | Power |
| | Gas |
| | Water |
| | Heating |
| | Grid control |
| | Industrial metering |
| Consumer Devices | Digital photo frame |
| | Digital camera |
| | eBook |

In the above description, the mobile device, the base station, the MME, and the gateway are described for ease of understanding as having a number of discrete modules (such as the communications control modules and the RRC/NAS/S1AP/IoT modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

In the above example embodiments, a number of software modules were described. As those skilled in the art will appreciate, the software modules may be provided in compiled or un-compiled form and may be supplied to the mobile device (UE), the base station, the MME, and the gateway as a signal over a computer network, or on a recording medium. Further, the functionality performed by part or all of this software may be performed using one or more dedicated hardware circuits. However, the use of software modules is preferred as it facilitates the updating of the mobile device (UE), the base station, the MME, and the gateway in order to update their functionalities.

Various other modifications will be apparent to those skilled in the art and will not be described in further detail here.

The whole or part of the example embodiments disclosed above can be described as, but not limited to, the following notes.

(Supplementary note 1) A core network node, comprising: a transmitter configured to transmit a control plane data back-off timer to restrict a request from a UE (User Equipment) for data transmission via Control Plane CIoT (Cellular Internet of Things) EPS (Evolved Packet System) Optimization.

(Supplementary note 2) The core network node according to Supplementary note 1, wherein the transmitter is further configured to transmit the control plane data back-off timer under overload condition in the core network node.

(Supplementary note 3) The core network node according to Supplementary note 1 or 2, wherein the core network node is further configured to reject the request for the data transmission via the Control Plane CIoT EPS Optimization from the UE for duration of the control plane data back-off timer.

(Supplementary note 4) The core network node according to any one of Supplementary notes 1 to 3, wherein the transmitter is further configured to transmit the control plane data back-off timer in a NAS (Non-Access Stratum) message.

(Supplementary note 5) The core network node according to any one of Supplementary notes 1 to 4, further comprising: a memory configured to store the control plane data back-off timer per UE.

(Supplementary note 6) A UE (User Equipment), comprising: a receiver configured to receive a control plane data back-off timer from a core network node; and a controller configured to not initiate data transmission via Control Plane CIoT (Cellular Internet of Things) EPS (Evolved Packet System) Optimization while the control plane data back-off timer is running.

(Supplementary note 7) The UE according to Supplementary note 6, wherein the controller is further configured to initiate data transmission via User Plane CIoT EPS Optimization while the control plane data back-off timer is running.

(Supplementary note 8) A transmission controlling method, comprising: transmitting a control plane data back-off timer to restrict a request from a User Equipment (UE) for data transmission via Control Plane CIoT (Cellular Internet of Things) EPS (Evolved Packet System) Optimization.

(Supplementary note 9) The transmission controlling method according to Supplementary note 8, wherein the transmitting is performed under overload condition in the core network node.

(Supplementary note 10) The transmission controlling method according to Supplementary note 8 or 9, further comprising: rejecting the request for the data transmission via the Control Plane CIoT EPS Optimization from the UE for the duration of the control plane data back-off timer.

(Supplementary note 11) The transmission controlling method according to any one of Supplementary notes 8 to 10, wherein the control plane data back-off timer is included in a NAS (Non-Access Stratum) message.

(Supplementary note 12) The transmission controlling method according to any one of Supplementary notes 8 to 11, further comprising: storing the control plane data back-off timer per UE.

(Supplementary note 13) A communication method, comprising: receiving a control plane data back-off timer from a core network node; and not initiating data transmission via Control Plane CIoT (Cellular Internet of Things) EPS (Evolved Packet System) Optimization while the control plane data back-off timer is running.

(Supplementary note 14) The communication method according to Supplementary note 13, further comprising: initiating data transmission via User Plane CIoT EPS Optimization while the control plane data back-off timer is running.

(Supplementary note 15) A computer program comprising computer implementable instructions for causing a programmable communications device to perform the method of any one of Supplementary notes 8 to 14.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from European Patent Application No. EP16275049.1, filed on Apr. 1, 2016, the disclosure of which is incorporated herein in its entirety by reference.

What is claimed is:

1. A core network node, comprising:
a transmitter configured to transmit a control plane data back-off timer to restrict only a request from a UE (User Equipment) for data transmission via Control Plane CIoT (Cellular Internet of Things) Optimization, under overload conditions from data transfer via a Control plane.

2. The core network node according to claim 1, wherein the transmitter is further configured to transmit the control plane data back-off timer under overload condition in the core network node.

3. The core network node according to claim 1, further comprising:
a memory storing instructions; and
at least one processor configured to process the instructions to:
reject the request for the data transmission via Control Plane CIoT Optimization from the UE for the duration of the control plane data back-off timer.

4. The core network node according to claim 1, wherein the transmitter is further configured to transmit the control plane data back-off timer in a NAS (Non-Access Stratum) message.

5. The core network node according to claim 1, further comprising:
a memory configured to store the control plane data back-off timer per UE.

6. A UE (User Equipment), comprising:
a receiver configured to receive a control plane data back-off timer from a core network node, under overload conditions from data transfer via a Control plane;
a memory configured to store instructions; and
at least one processor configured to process the instructions to not initiate only data transmission via Control Plane CIoT (Cellular Internet of Things) Optimization while the control plane data back-off timer is running.

7. The UE according to claim 6, wherein the at least one processor is further configured to process the instructions to initiate data transmission via User Plane CIoT Optimization while the control plane data back-off timer is running.

8. A transmission controlling method, comprising:
transmitting a control plane data back-off timer to restrict only a request from a User Equipment (UE) for data transmission via Control Plane CIoT (Cellular Internet of Things) Optimization, under overload conditions from data transfer via a Control plane.

9. The transmission controlling method according to claim 8, wherein the transmitting is performed under overload condition in the core network node.

10. The transmission controlling method according to claim 8, further comprising:
rejecting the request for the data transmission via Control Plane CIoT Optimization from the UE for the duration of the control plane data back-off timer.

11. The transmission controlling method according to claim 8, wherein the control plane data back-off timer is included in a NAS (Non-Access Stratum) message.

12. The transmission controlling method according to claim 8, further comprising:
storing the control plane data back-off timer per UE.

13. A communication method, comprising:
receiving a control plane data back-off timer from a core network node, under overload conditions from data transfer via a Control plane; and
not initiating only data transmission via Control Plane CIoT (Cellular Internet of Things) Optimization while the control plane data back-off timer is running.

14. The communication method according to claim 13, further comprising:
initiating data transmission via User Plane CIoT Optimization while the control plane data back-off timer is running.

* * * * *